United States Patent
Sasaki et al.

(10) Patent No.: US 7,123,328 B2
(45) Date of Patent: Oct. 17, 2006

(54) POLARIZATION PLATE HAVING OPTICAL COMPENSATION FUNCTION AND LIQUID CRYSTAL DISPLAY DEVICE USING THE SAME

(75) Inventors: Shinichi Sasaki, Ibaraki (JP); Nao Murakami, Ibaraki (JP); Hiroyuki Yoshimi, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 84 days.

(21) Appl. No.: 10/509,762

(22) PCT Filed: Apr. 17, 2003

(86) PCT No.: PCT/JP03/04873

§ 371 (c)(1),
(2), (4) Date: Sep. 30, 2004

(87) PCT Pub. No.: WO03/093881

PCT Pub. Date: Nov. 13, 2003

(65) Prior Publication Data

US 2005/0206810 A1  Sep. 22, 2005

(30) Foreign Application Priority Data

Apr. 18, 2002 (JP) .............................. 2002-115610

(51) Int. Cl.
*G02F 1/1335* (2006.01)

(52) U.S. Cl. ..................... 349/118; 349/119

(58) Field of Classification Search ................ 349/119, 349/115, 118
See application file for complete search history.

(56) References Cited

U.S. PATENT DOCUMENTS

| 6,829,026 B1* | 12/2004 | Sasaki et al. ............... 349/118 |
| 6,937,307 B1* | 8/2005 | Ito et al. ..................... 349/117 |
| 2005/0078245 A1* | 4/2005 | Sasaki et al. ............... 349/117 |
| 2005/0099562 A1* | 5/2005 | Nishikouji et al. ......... 349/117 |

FOREIGN PATENT DOCUMENTS

EP  1 160 591  12/2001

(Continued)

OTHER PUBLICATIONS

Office Action of Corresponding Chinese Patent Application No. 03808603.4 mailed Mar. 3, 2006.

*Primary Examiner*—Toan Ton
(74) *Attorney, Agent, or Firm*—Westerman, Hattori, Daniels & Adrian LLP

(57) ABSTRACT

As a polarizing plate with optical compensation function, that is thin and excellent in optical characteristics, the present invention provides a polarizing plate with optical compensation function including at least two optically compensating layers. The optically compensating layers includes: an optically compensating A-layer formed of a polymer film, satisfying conditions represented by formulae (I) and (II) below; and an optically compensating B-layer formed of a non-liquid crystalline polymer film, satisfying conditions represented by formulae (III) to (V) below.

$$20 \text{ (nm)} \leq Re_a \leq 300 \text{ (nm)} \quad \text{(I)}$$

$$1.0 \leq Rz_d/Re_a \leq 8 \quad \text{(II)}$$

$$1 \text{ (nm)} \leq Re_b \leq 100 \text{ (nm)} \quad \text{(III)}$$

$$5 \leq Rz_b/Re_b \leq 100 \quad \text{(IV)}$$

$$1 \text{ (}\mu\text{m)} \leq d_b \leq 20 \text{ (}\mu\text{m)} \quad \text{(V)}$$

The present invention also provides a liquid crystal display using the polarizing plate.

15 Claims, 6 Drawing Sheets

FOREIGN PATENT DOCUMENTS

| | | |
|---|---|---|
| JP | 3-24502 | 2/1991 |
| JP | 3-33719 | 2/1991 |
| JP | 8-511812 | 12/1996 |
| JP | 10-508048 | 8/1998 |
| JP | 10-332933 | 12/1998 |
| JP | 2000-56132 A | 2/2000 |
| JP | 2001-49110 | 2/2001 |
| JP | 2001-343529 | 12/2001 |
| WO | WO 94/24191 | 10/1994 |
| WO | WO 96/11967 | 4/1996 |

* cited by examiner

POLARIZATION PLATE HAVING OPTICAL COMPENSATION FUNCTION AND LIQUID CRYSTAL DISPLAY DEVICE USING THE SAME

TECHNICAL FIELD

The present invention relates to a polarizing plate with optical compensation function, and a liquid crystal display using the same.

BACKGROUND ART

An optically compensating layer with controlled principal refraction indices (nx, ny, nz) in two in-plane directions and in a thickness direction is required for obtaining a liquid crystal display that compensates birefringence of a liquid crystal cell and provides an excellent omnidirectional display. It should be noted particularly that a VA (Vertically Aligned) type or an OCB (Optically Compensated Bend) type liquid crystal display requires an optically compensating layer providing principal refraction indices in three directions of $nx \geq ny > nz$.

Conventionally, as an optically compensating layer, an optically compensating layer having a single layer structure prepared by stretching a polymer film transversely or biaxially with a tenter has been used (see JP 3(1991)-24502 A, for example). However, such an optically compensating layer with a single layer structure has a problem in that it is not possible to achieve desired retardation values because the difference between the refractive index in the thickness direction and the refractive index in each of the in-plane directions is small.

On the other hand, in order to achieve desired retardation values, an optically compensating layer prepared by laminating at least two stretched polymer films also has been used. For example, there has been known an optically compensating layer prepared by providing two uniaxially stretched polymer films and laminating them so that the directions of the in-plane slow axes of the respective polymer films cross at right angles (see JP 3(1991)-33719 A, for example).

However, since a stretched polymer film is as thick as about 1 mm, an optically compensating layer formed by laminating two or more stretched polymer films will become very thick, thus arising a problem in that the whole thickness of the liquid crystal display including such an optically compensating layer increases.

DISCLOSURE OF INVENTION

It is an object of the present invention to provide a polarizing plate with optical compensation function, that is excellent in optical characteristics and includes thin optically compensating layers.

The present invention provides a polarizing plate with optical compensation function including at least two optically compensating layers. The optically compensating layers includes: an optically compensating A-layer formed of a polymer film, satisfying conditions represented by formulae (I) and (II) below; and an optically compensating B-layer formed of a non-liquid crystalline polymer film, satisfying conditions represented by formulae (III) to (V) below.

$$20 \text{ (nm)} \leq Re_a \leq 300 \text{ (nm)} \tag{I}$$

$$1.0 \leq Rz_a/Re_a \leq 8 \tag{II}$$

$$1 \text{ (nm)} \leq Re_b \leq 100 \text{ (nm)} \tag{III}$$

$$5 \leq Rz_b/Re_b \leq 100 \tag{IV}$$

$$1 \text{ (μm)} \leq d_b \leq 20 \text{ (μm)} \tag{V}$$

In the formulae (I) and (II), $Re_a = (nx_a - ny_a) \cdot d_a$ and $Rz_a = (nx_a - nz_a) \cdot d_a$, where $nx_a$, $ny_a$, and $nz_a$ represent refractive indices in an X-axis direction, a Y-axis direction, and a Z-axis direction in the optically compensating A-layer, respectively, with the X-axis direction being an axial direction exhibiting a maximum refractive index within a plane of the optically compensating A-layer, the Y-axis direction being an axial direction perpendicular to the X-axis within the plane, the Z-axis direction being a thickness direction perpendicular to the X-axis and the Y-axis, and $d_a$ represents a thickness of the optically compensating A-layer.

In the formulae (III) to (V), $Re_b = (nx_b - ny_b) \cdot d_b$ and $Rz_b = (nx_b - nz_b) \cdot d_b$, where $nx_b$, $ny_b$, and $nz_b$ represent refractive indices in an X-axis direction, a Y-axis direction, and a Z-axis direction in the optically compensating B-layer, respectively, with the X-axis direction being an axial direction exhibiting a maximum refractive index within a plane of the optically compensating B-layer, the Y-axis direction being an axial direction perpendicular to the X-axis within the plane, the Z-axis direction being a thickness direction perpendicular to the X-axis and the Y-axis, and $d_b$ represents a thickness of the optically compensating B-layer.

The present invention also provides a liquid crystal display including a liquid crystal cell and a polarizing plate with optical compensation function according to the present invention, wherein the polarizing plate is arranged on at least one surface of the liquid crystal cell.

PREFERRED MODE FOR CARRYING OUT THE INVENTION

Figure 1:
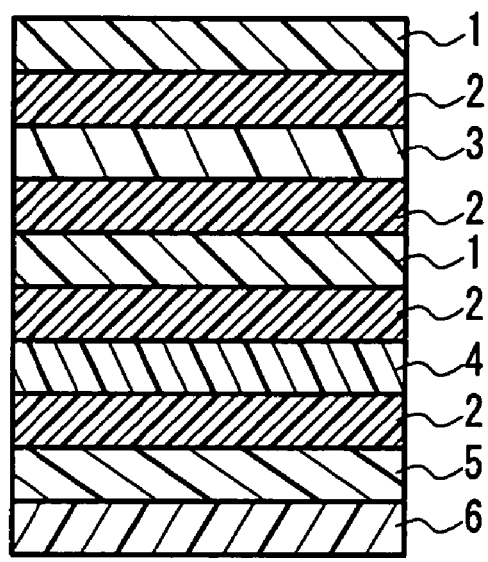
FIG. 1 is a schematic cross-sectional view showing an example of a polarizing plate with optical compensation function according to the present invention.

A polarizing plate with optical compensation function according to the present invention includes: an optically compensating A-layer that includes a polymer film and has particular retardation values in its in-plane directions and thickness direction; and an optically compensating B-layer that includes a non-liquid crystalline polymer film and has particular retardation values in its in-plane directions and thickness direction. This allows the polarizing plate as a whole to achieve desired retardation values.

Furthermore, the thickness of a non-liquid crystalline polymer film generally is 30 μm or less, preferably 15 μm or less, and more preferably 10 μm or less. Accordingly, a laminate that includes the optically compensating A-layer and the optically compensating slayer including such a thin non-liquid crystalline polymer film can be a thin polarizing plate with optical compensation function.

It is to be noted that, as long as the polarizing plate with optical compensation function according to the present invention includes an optically compensating A-layer and an optically compensating B-layer as described above and a polarizing layer, the order of laminating these layers can be decided arbitrarily. The order can be, for example: a polarizing layer, an optically compensating A-layer, and an optically compensating B-layer; or, a polarizing layer, an optically compensating B-layer, and an optically compensating A-layer. Furthermore, the polarizing plate with optical compensation function according to the present invention may include two or more of both or either of the optically compensating A-layer and the optically compensating B-layer. In this case also, the order of laminating these layers is not limited. For example, the order can be: a polarizing layer, an optically compensating B-layer, an optically compensating A-layer, and an optically compensating B-layer.

For example, it is preferable that the polarizing plate with optical compensation function according to the present invention includes an optically compensating A-layer satisfying 30 (nm)$\leq Re_a \leq$80 (nm) and 1$\leq Rz_d/Re_a \leq$3, and an optically compensating B-layer satisfying 1 (nm)$\leq Re_b \leq$30 (nm) and 8$\leq Rz_b/Re_b \leq$50. This is because, when the optically compensating A-layer and the optically compensating slayer satisfy the foregoing conditions, the polarizing plate can produce an effect that deterioration in contrast can be suppressed and changes in color can be reduced over a wide viewing angle.

Furthermore, it is more preferable that the polarizing plate with optical compensation function according to the present invention includes an optically compensating A-layer satisfying 30 (nm)$\leq Re_a \leq$60 (nm) and 1$\leq Rz_d/Re_a \leq$3, and an optically compensating B-layer satisfying 3 (nm)$\leq Re_b \leq$30 (nm) and 8$\leq Rz_b/Re_b \leq$40.

In the present invention, the polymer film included in the optically compensating A-layer is formed of a stretched polymer film, a liquid crystal film, or the like, for example. The stretched polymer film can be produced, for example, by stretching an unstretched polymer film.

Though the unstretched polymer film is not particularly limited, it is preferable that the unstretched polymer film is formed of polymers that can impart an optical anisotropy to the film when the film is stretched and have excellent birefringence controllability, transparency, thermal resistance, and surface smoothness. To be more specific with regard to the transparency, polymers that can form a film having a light transmittance of at least 75%, particularly at least 85%, are preferable. It is possible to use one of these polymers alone or a mixture of two or more of these polymers.

Although polymers used for forming the unstretched polymer film are not particularly limited, it is preferable to use polymers that exhibit positive birefringence (which means, when the formed film is stretched, a refractive index in the stretching direction becomes greater). The examples of such polymers include polyolefins (e.g., polyethylene and polypropylene), polynorbornene, polyester, polyvinyl chloride, polystyrene, polyacrylonitrile, polysulfone, acrylic resins, polyarylate, polyvinyl alcohol, polymethacrylate, polyacrylic ester, polycarbonate, polyethersulfone, cellulosic resins (e.g., cellulose ester and cellulose ether), norbornene resins, vinylidene chloride, and copolymers thereof.

Furthermore, a polymer used for forming the unstretched polymer film may be a mixture of a non-crystalline polymer that exhibits negative birefringence as described later and a polymer that exhibits positive birefringence as described above. In this case, a mixing ratio of a polymer exhibiting negative birefringence and a polymer exhibiting positive birefringence can be determined suitably considering the birefringences and a photoelastic coefficient. For example, a mixing molar ratio (X:Y) of a polymer (X) exhibiting negative birefringence and a polymer (Y) exhibiting positive birefringence is in the range between 20:80 and 80:20 inclusive, preferably between 30:70 and 70:30 inclusive.

Another example of the polymer film is described in JP 2001-343529 A (WO 01/37007). The polymer material used can be a resin composition containing a thermoplastic resin whose side chain has a substituted or unsubtituted imido group and a thermoplastic resin whose side chain has a substituted or unsubstituted phenyl group and cyano group, for example, a resin composition containing an alternating copolymer of isobutene and N-methyl maleimide and an acrylonitrile-styrene copolymer.

The method of producing the unstretched polymer film is not particularly limited, and any ordinary methods, e.g., casting methods such as film flow-expanding, roller coating, and flow coating, and extrusion, can be applied. Among these, extrusion, film flow-expanding, and a casting method are preferable because variations in birefringence of the polymer film that has been stretched can be reduced. When forming the unstretched polymer film, various additives such as a stabilizer, a plasticizer, metals, and the like further may be blended as necessary.

The thickness of the unstretched polymer film may be, for example, not more than 500 mm, preferably in the range from 10 μm to 500 μm, and particularly preferably in the range from 20 μm to 300 μm.

The method of stretching the unstretched polymer film is not particularly limited, and any ordinary methods can be applied. The examples include tenter transverse stretching, biaxial stretching, and stretching along the machine direction according to methods using rollers. It is preferable in the biaxial stretching that the stretch ratio in the long axis direction is lower than that in the short axis direction. The biaxial stretching can be selected from simultaneous biaxial stretching that uses a tenter alone, and sequential biaxial stretching that uses rollers and a tenter. In the stretching along the machine direction by methods using rollers, heating may be performed by a method of using heating rollers, a method of heating an ambient atmosphere, or a method of performing both of these methods.

Though the stretch ratio of the unstretched polymer film varies depending on the stretching method, it is in general from 1.05 to 3 times, preferably 1.05 to 2 times the length of the unstretched polymer film.

The temperature for stretching the unstretched polymer film is selected suitably depending on the glass transition point (Tg) of the unstretched polymer film in use, the kinds of additives in the unstretched polymer film, and the like. The temperature for stretching the unstretched polymer film is, for example, 70° C. to 250° C., preferably 100° C. to 200° C., and particularly preferably 120° C. to 180° C. Especially, it is preferable that the temperature for stretching the unstretched polymer film is substantially equal to or higher than Tg of the unstretched polymer film.

The thickness of the stretched polymer film can be determined suitably according to the screen size of an image display to which the film will be applied. The thickness of the stretched polymer film may be, for example, not more than 300 mm, preferably in the range from 10 to 150 µm, and particularly preferably in the range from 20 to 120 µm.

It is to be noted that the present invention is characterized in that an optically compensating A-layer satisfying the formulae (I) and (II) and an optically compensating B-layer satisfying the formulae (III) to (V) are used in combination, as optically compensating layers to be used with a polarizing layer.

In the above-described manner, the optically compensating A-layer formed of a polymer film is produced so as to satisfy the formulae (I) and (II) below.

$$20 \text{ (nm)} \leq Re_a \leq 300 \text{ (nm)} \tag{I}$$

$$1.0 \leq Rz_d/Re_a \leq 8 \tag{II}$$

When $Re_a$ satisfies the formula (I), it is possible to visually compensate the polarizing plate sufficiently, and when $Rz_d/Re_a$ satisfies the formula (II), it is possible to compensate the birefringence of a liquid crystal cell sufficiently.

$Re_a$ in the formula (I) preferably satisfies $20 \text{ (nm)} \leq Re_a \leq 250 \text{ (nm)}$, more preferably $22 \text{ (nm)} \leq Re_a \leq 200 \text{ (nm)}$, and still more preferably $25 \text{ (nm)} \leq Re_a \leq 150 \text{ (nm)}$, because coloration that may be caused depending on a visual angle can be suppressed.

On the other hand, $Rz_d/Re_a$ in the formula (II) preferably satisfies $1.0 \leq Rz_d/Re_a \leq 7$, more preferably $1.0 \leq Rz_d/Re_a \leq 6$, and still more preferably $1.0 \leq Rz_d/Re_a \leq 5$, because the birefringence of a liquid crystal cell can be compensated when liquid crystal in the cell is in homeotropic alignment.

It is to be noted that any liquid crystal films may be used as a liquid crystal film, as long as they satisfy the formulae (I) and (II) above. Such films can be produced by a conventionally known method. However, it is preferable to use a nematic liquid crystal film.

Anyone having an ordinary skill in the art can prepare a stretched polymer film satisfying the formulae (I) and (II), for example, by setting the kind of polymer, the stretching condition, etc. suitably, without conducting any undue experimentation.

For example, when an unstretched polymer film "ZEONOR (trade name)" (manufactured by ZEON Corporation) having a thickness of 40 to 100 µm is stretched with a tenter to 1.1 to 1.5 times its original length at 120° C. to 150° C. to give a stretched polymer film having a thickness of 20 to 90 µm, this stretched polymer film satisfies the above formulae (I) and (II).

Alternatively, when an unstretched polymer film "ARTON (trade name)" (manufactured by JSR Corporation) having a thickness of 40 to 100 µm is stretched in the longitudinal direction by uniaxial stretching to 1.05 to 1.5 times its original length at 170° C. to 180° C. to give a stretched polymer film having a thickness of 20 to 90 µm, this stretched polymer film satisfies the above formulae (I) and (II).

Next, an optically compensating B-layer according to the present invention can be produced, for example, by preparing a non-liquid crystalline polymer solution by dissolving non-liquid crystalline polymer in a solvent, coating the optically compensating A-layer or a base with the solution, and then hardening the coating layer. Alternatively, an optically compensating B-layer according to the present invention can be produced, for example, by preparing a melt, instead of a solution, of non-liquid crystalline polymer by melting the non-liquid crystalline polymer with heat, coating the optically compensating A-layer or a base with the melt, and then hardening the coating layer by cooling it.

The non-liquid crystalline polymer may be polyamide, polyimide, polyester, polyetherketone, polyaryletherketone, polyamide imide, polyesterimide, or the like because of its excellent heat resistance, chemical resistance, transparency, and hardness. It may be possible to use one of these polymers alone or a mixture of two or more polymers having different functional groups, for example, a mixture of polyaryletherketone and polyamide. Among these polymers, polyimide is particularly preferable because of its high transparency, high aligning property, and high stretching property.

The molecular weight of the non-liquid crystalline polymer is not particularly limited, but the weight-average molecular weight (Mw) thereof preferably ranges from 1,000 to 1,000,000 and more preferably ranges from 2,000 to 500,000.

As the polyimide, it is preferable to use a polyimide that has a high in-plane aligning property and is soluble in an organic solvent. Specifically, examples of such a polyimide include a condensation polymer product of 9,9-bis(aminoaryl)fluorene and an aromatic tetracarboxylic dianhydride disclosed in JP 2000-511296 A, i.e., a polymer containing at least one repeating unit represented by the formula (1) below.

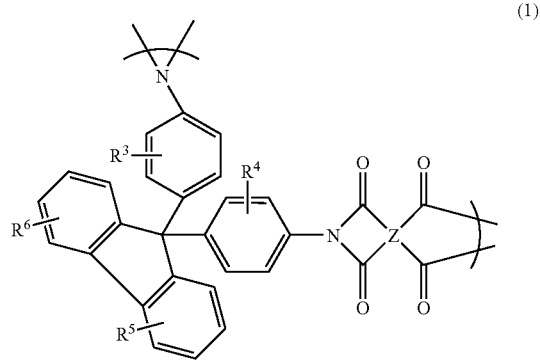

(1)

In the above formula (1), $R^3$ to $R^6$ are at least one substituent selected independently from the group consisting of hydrogen, halogen, a phenyl group, a phenyl group substituted with 1 to 4 halogen atoms or a $C_{1-10}$ alkyl group, and a $C_{1-10}$ alkyl group. Preferably, $R^3$ to $R^6$ are at least one substituent selected independently from the group consisting of halogen, a phenyl group, a phenyl group substituted with 1 to 4 halogen atoms or a $C_{1-10}$ alkyl group, and a $C_{1-10}$ alkyl group.

In the above formula (1), Z is, for example, a $C_{6-20}$ quadrivalent aromatic group, and preferably is a pyromellitic group, a polycyclic aromatic group, a derivative of a polycyclic aromatic group, or a group represented by the formula (2) below.

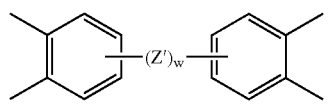

(2)

In the formula (2) above, Z' is, for example, a covalent bond, a $C(R^7)_2$ group, a CO group, an O atom, an S atom, an $SO_2$ group, an $Si(C_2H_5)_2$ group, or an $NR^8$ group. When there are plural Z's, they may be the same or different. Also, w is an integer from 1 to 10. $R^7$s independently are hydrogen or $C(R^9)_3$. $R^8$ is hydrogen, an alkyl group having from 1 to about 20 carbon atoms, or a $C_{6-20}$ aryl group, and when there are plural $R^8$s, they may be the same or different. $R^9$s independently are hydrogen, fluorine, or chlorine.

The above-mentioned polycyclic aromatic group may be, for example, a quadrivalent group derived from naphthalene, fluorene, benzofluorene, or anthracene. Further, a substituted derivative of the above-mentioned polycyclic aromatic group may be the above-mentioned polycyclic aromatic group substituted with at least one group selected from the group consisting of, for example, a $C_{1-10}$ alkyl group, a fluorinated derivative thereof, and halogen such as F and Cl.

Other than the above, homopolymer whose repeating unit is represented by the general formula (3) or (4) below or polyimide whose repeating unit is represented by the general formula (5) below disclosed in JP 8(1996)-511812 A may be used, for example. The polyimide represented by the formula (5) below is a preferable mode of the homopolymer represented by the formula (3).

halogen), a CO group, an O atom, an S atom, an $SO_2$ group, an $Si(CH_2CH_3)_2$ group, and an $N(CH_3)$ group, and G and G' may be the same or different.

In the above formulae (3) and (5), L is a substituent, and d and e indicate the number of substitutions therein. L is, for example, halogen, a $C_{1-3}$ alkyl group, a halogenated $C_{1-3}$ alkyl group, a phenyl group, or a substituted phenyl group, and when there are plural Ls, they may be the same or different. The above-mentioned substituted phenyl group may be, for example, a substituted phenyl group having at least one substituent selected from the group consisting of halogen, a $C_{1-3}$ alkyl group, and a halogenated $C_{1-3}$ alkyl group. Also, the above-mentioned halogen may be, for example, fluorine, chlorine, bromine, or iodine. d is an integer from 0 to 2, and e is an integer from 0 to 3.

In the above formulae (3) to (5), Q is a substituent, and f indicates the number of substitutions therein. Q may be, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkyl ester group, and a substituted alkyl ester group and, when there are plural Qs, they may be the same or different. The above-mentioned halogen may be, for example, fluorine, chlorine, bromine, or iodine. The above-mentioned substituted alkyl group may be, for example, a halogenated alkyl group. Also, the above-mentioned substituted aryl group may be, for example, a halogenated aryl group. f is an integer from 0 to 4, and g and h respectively are an integer from 0 to 3 and an integer from 1 to 3. Furthermore, it is preferable that g and h are larger than 1.

In the above formula (4), $R^{10}$ and $R^{11}$ are groups selected independently from the group consisting of hydrogen, halogen, a phenyl group, a substituted phenyl group, an alkyl group, and a substituted alkyl group. It is particularly preferable that $R^{10}$ and $R^{11}$ independently are a halogenated alkyl group.

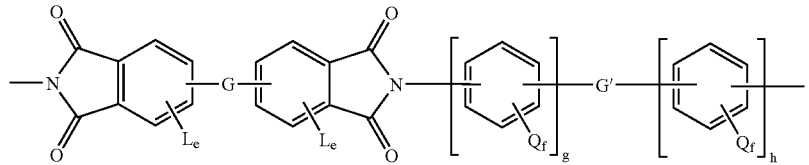

(3)

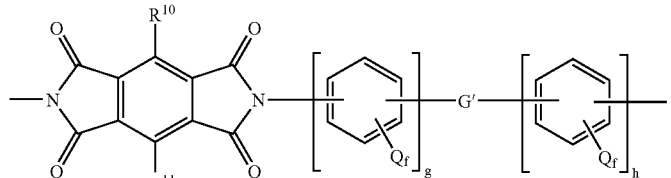

(4)

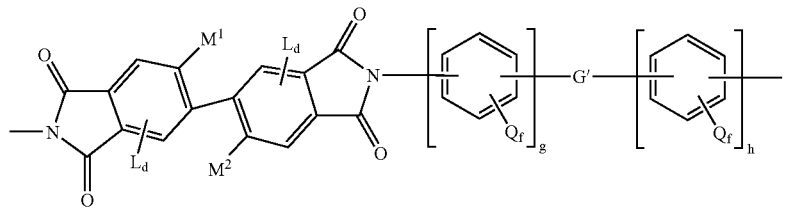

(5)

In the above general formulae (3) to (5), G and G' each are a group selected independently from the group consisting of, for example, a covalent bond, a $CH_2$ group, a $C(CH_3)_2$ group, a $C(CF_3)_2$ group, a $C(CX_3)_2$ group (wherein X is In the above formula (5), $M^1$ and $M^2$ may be the same or different and, for example, halogen, a $C_{1-3}$ alkyl group, a halogenated $C_{1-3}$ alkyl group, a phenyl group, or a substituted phenyl group. The above-mentioned halogen may be, for example, fluorine, chlorine, bromine, or iodine. The above-mentioned substituted phenyl group may be, for example, a substituted phenyl group having at least one substituent selected from the group consisting of halogen, a $C_{1-3}$ alkyl group, and a halogenated $C_{1-3}$ alkyl group.

A specific example of polyimide represented by the formula (3) includes polyimide represented by the formula (6) below.

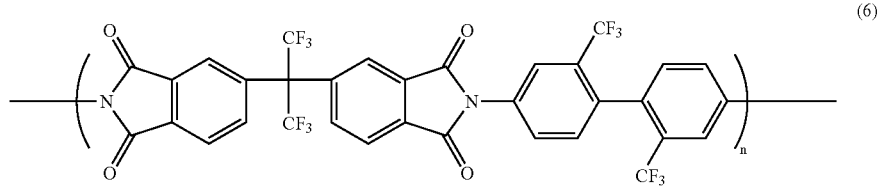

Moreover, the above-mentioned polyimide may be, for example, copolymer obtained by copolymerizing acid dianhydride and diamine other than the above-noted skeleton (the repeating unit) suitably.

The above-mentioned acid dianhydride may be, for example, aromatic tetracarboxylic dianhydride. The aromatic tetracarboxylic dianhydride may be, for example, pyromellitic dianhydride, benzophenone tetracarboxylic dianhydride, naphthalene tetracarboxylic dianhydride, heterocyclic aromatic tetracarboxylic dianhydride, or 2,2'-substituted biphenyl tetracarboxylic dianhydride.

The pyromellitic dianhydride may be, for example, pyromellitic dianhydride, 3,6-diphenyl pyromellitic dianhydride, 3,6-bis(trifluoromethyl)pyromellitic dianhydride, 3,6-dibromopyromellitic dianhydride, or 3,6-dichloropyromellitic dianhydride. The benzophenone tetracarboxylic dianhydride may be, for example, 3,3',4,4'-benzophenone tetracarboxylic dianhydride, 2,3,3',4'-benzophenone tetracarboxylic dianhydride, or 2,2',3,3'-benzophenone tetracarboxylic dianhydride. The naphthalene tetracarboxylic dianhydride may be, for example, 2,3,6,7-naphthalenetetracarboxylic dianhydride, 1,2,5,6-naphthalenetetracarboxylic dianhydride, or 2,6-dichloro-naphthalene-1,4,5,8-tetracarboxylic dianhydride. The heterocyclic aromatic tetracarboxylic dianhydride may be, for example, thiophene-2,3,4,5-tetracarboxylic dianhydride, pyrazine-2,3,5,6-tetracarboxylic dianhydride, or pyridine-2,3,5,6-tetracarboxylic dianhydride. The 2,2'-substituted biphenyl tetracarboxylic dianhydride may be, for example, 2,2'-dibromo-4,4',5,5'-biphenyl tetracarboxylic dianhydride, 2,2'-dichloro-4,4',5,5'-biphenyl tetracarboxylic dianhydride, or 2,2'-bis(trifluoromethyl)-4,4',5,5'-biphenyl tetracarboxylic dianhydride.

Other examples of the aromatic tetracarboxylic dianhydride may include 3,3',4,4'-biphenyl tetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-bis(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride, 3,3',4,4'-diphenylsulfone tetracarboxylic dianhydride, 4,4'-[4,4'-isopropylidene-di(p-phenyleneoxy)]bis(phthalic dianhydride), N,N-(3,4-dicarboxyphenyl)-N-methylamine dianhydride, and bis(3,4-dicarboxyphenyl)diethylsilane dianhydride.

Among the above, the aromatic tetracarboxylic dianhydride preferably is 2,2'-substituted biphenyl tetracarboxylic dianhydride, more preferably is 2,2'-bis(trihalomethyl)-4,4',5,5'-biphenyl tetracarboxylic dianhydride, and further preferably is 2,2'-bis(trifluoromethyl)-4,4',5,5'-biphenyl tetracarboxylic dianhydride.

The above-mentioned diamine may be, for example, aromatic diamine. Specific examples thereof include benzenediamine, diaminobenzophenone, naphthalenediamine, heterocyclic aromatic diamine, and other aromatic diamines.

The benzenediamine may be, for example, diamine selected from the group consisting of benzenediamines such as o-, m-, and p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone may include 2,2'-diaminobenzophenone and 3,3'-diaminobenzophenone. The naphthalenediamine may be, for example, 1,8-diaminonaphthalene or 1,5-diaminonaphthalene. Examples of the heterocyclic aromatic diamine may include 2,6-diaminopyridine, 2,4-diaminopyridine, and 2,4-diamino-S-triazine.

Further, other than the above, the aromatic diamine may be 4,4'-diaminobiphenyl, 4,4'-diaminodiphenyl methane, 4,4'-(9-fluorenylidene)-dianiline, 2,2'-bis(trifluoromethyl)-4,4'-diaminobiphenyl, 3,3'-dichloro-4,4'-diaminodiphenyl methane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diamino diphenyl ether, 3,4'-diamino diphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3,-hexafluoropropane, 4,4'-diamino diphenyl thioether, or 4,4'-diaminodiphenylsulfone.

The polyetherketone may be, for example, polyaryletherketone represented by the general formula (7) below, which is disclosed in JP 2001-49110 A.

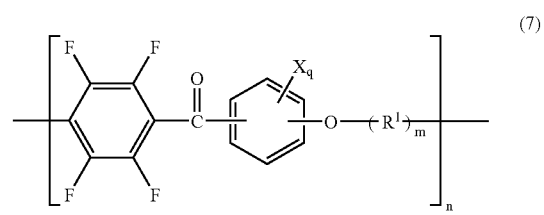

In the above formula (7), X is a substituent, and q is the number of substitutions therein. X is, for example, a halogen atom, a lower alkyl group, a halogenated alkyl group, a lower alkoxy group, or a halogenated alkoxy group, and when there are plural Xs, they may be the same or different.

The halogen atom may be, for example, a fluorine atom, a bromine atom, a chlorine atom, or an iodine atom, and among these, a fluorine atom is preferable. The lower alkyl group preferably is a $C_{1-6}$ lower straight chain alkyl group or a $C_{1-6}$ lower branched chain alkyl group and more preferably is a $C_{1-4}$ straight or branched chain alkyl group, for example. More specifically, it preferably is a methyl group, an ethyl group, a propyl group, an isopropyl group, a butyl group, an isobutyl group, a sec-butyl group, or a tert-butyl group, and particularly preferably is a methyl group or an ethyl group. The halogenated alkyl group may be, for example, a halide of the above-mentioned lower alkyl group such as a trifluoromethyl group. The lower alkoxy group preferably is a $C_{1-6}$ straight or branched chain alkoxy group and more preferably is a $C_{1-4}$ straight or branched chain alkoxy group, for example. More specifically, it further preferably is a methoxy group, an ethoxy group, a propoxy group, an isopropoxy group, a butoxy group, an isobutoxy group, a sec-butoxy group, or a tert-butoxy group, and particularly preferably is a methoxy group or an ethoxy group. The halogenated alkoxy group may be, for example, a halide of the above-mentioned lower alkoxy group such as a trifluoromethoxy group.

In the above formula (7), q is an integer from 0 to 4. In the formula (7), it is preferable that q=0 and a carbonyl group and an oxygen atom of an ether that are bonded to both ends of a benzene ring are present at para positions.

Also, in the above formula (7), $R^1$ is a group represented by the formula (8) below, and m is an integer of 0 or 1.

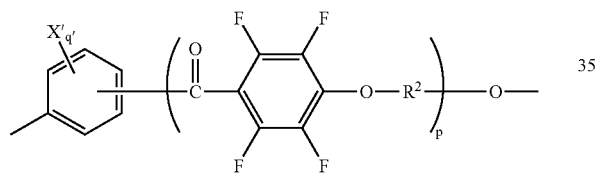

(8)

In the above formula (8), X' is a substituent and is the same as X in the formula (7), for example. In the formula (8), when there are plural X's, they may be the same or different. q' indicates the number of substitutions in the X' and is an integer from 0 to 4, preferably, q'=0. In addition, p is an integer of 0 or 1.

In the formula (8), $R^2$ is a divalent aromatic group. This divalent aromatic group is, for example, an o-, m-, or p-phenylene group or a divalent group derived from naphthalene, biphenyl, anthracene, o-, m-, or p-terphenyl, phenanthrene, dibenzofuran, biphenyl ether, or biphenyl sulfone. In these divalent aromatic groups, hydrogen that is bonded directly to the aromatic may be substituted with a halogen atom, a lower alkyl group, or a lower alkoxy group. Among them, the $R^2$ preferably is an aromatic group selected from the group consisting of the formulae (9) to (15) below.

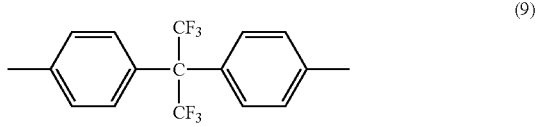

(9)

-continued

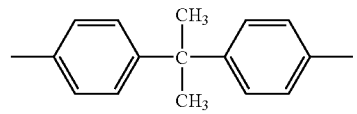

(10)

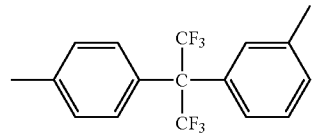

(11)

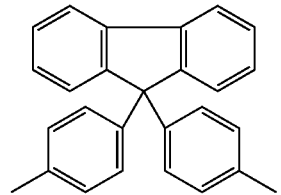

(12)

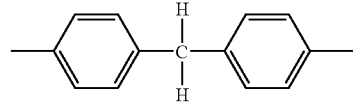

(13)

(14)

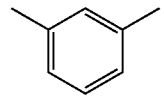

(15)

In the above formula (7), the $R^1$ preferably is a group represented by the formula (16) below, wherein $R^2$ and p are equivalent to those in the above-noted formula (8).

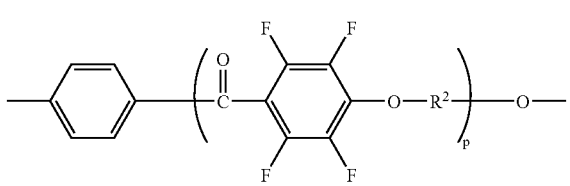

(16)

Furthermore, in the formula (7), n indicates a degree of polymerization ranging, for example, from 2 to 5000 and preferably from 5 to 500. The polymerization may be composed of repeating units with the same structure or those with different structures. In the latter case, the polymerization form of the repeating units may be a block polymerization or a random polymerization.

Moreover, it is preferable that an end on a p-tetrafluorobenzoylene group side of the polyaryletherketone represented by the formula (7) is fluorine and an end on an oxyalkylene group side thereof is a hydrogen atom. Such a polyaryletherketone can be represented by the general formula (17) below, for example. In the formula below, n indicates a degree of polymerization as in the formula (7).

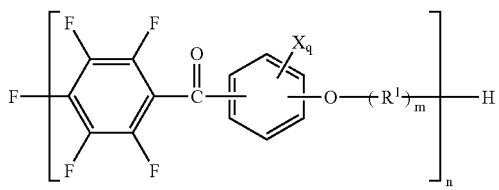

Specific examples of the polyaryletherketone represented by the formula (7) may include those represented by the formulae (18) to (21) below, wherein n indicates a degree of polymerization as in the formula (7).

In the above formula (22), Y is O or NH. E is, for example, at least one group selected from the group consisting of a covalent bond, a $C_2$ alkylene group, a halogenated $C_2$ alkylene group, a $CH_2$ group, a $C(CX_3)_2$ group (wherein X is halogen or hydrogen), a CO group, an O atom, an S atom, an $SO_2$ group, an $Si(R)_2$ group, and an N(R) group, and Es may be the same or different. In the above-mentioned E, R is at least one of a $C_{1-3}$ alkyl group and a halogenated $C_{1-3}$ alkyl group and present at a meta position or a para position with respect to a carbonyl functional group or a Y group.

Further, in the above formula (22), A and A' are substituents, and t and z respectively indicate the numbers of substitutions therein. Additionally, p is an integer from 0 to 3, q is an integer from 1 to 3, and r is an integer from 0 to 3.

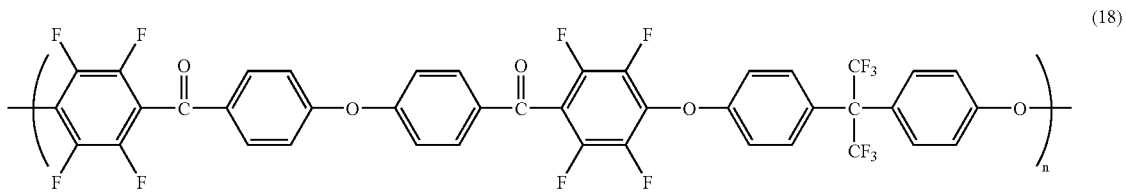

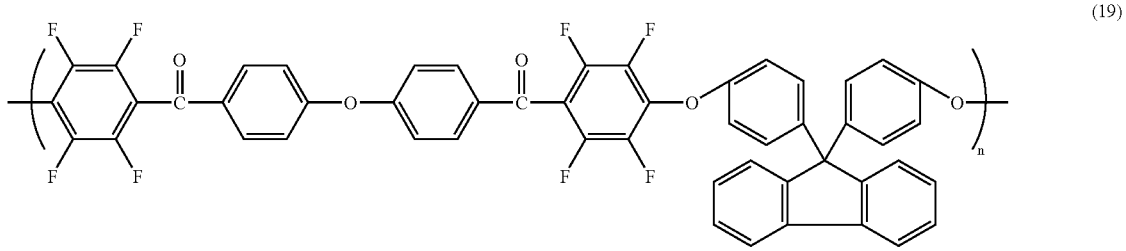

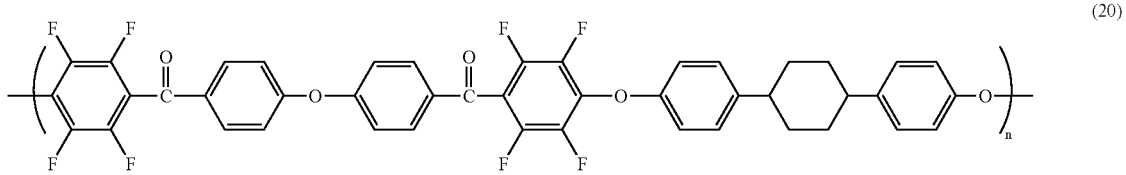

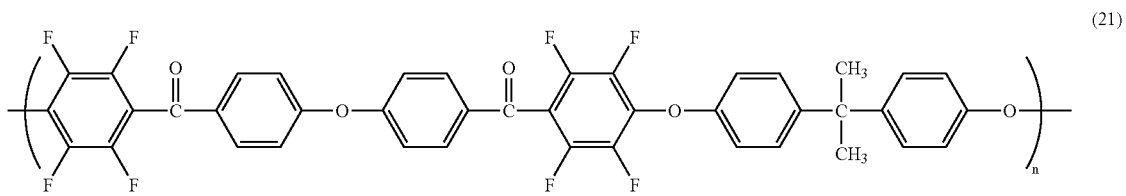

Other than the above, the polyamide or polyester may be, for example, polyamide or polyester described by JP 10(1998)-508048 A, and their repeating units can be represented by the general formula (22) below.

The above-mentioned A is selected from the group consisting of, for example, hydrogen, halogen, a $C_{1-3}$ alkyl group, a halogenated $C_{1-3}$ alkyl group, an alkoxy group represented by OR (wherein R is the group defined above),

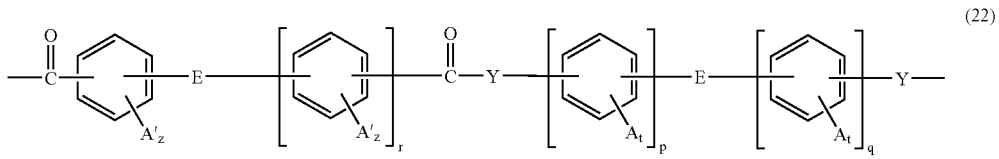

an aryl group, a substituted aryl group by halogenation or the like, a $C_{1-9}$ alkoxycarbonyl group, a $C_{1-9}$ alkylcarbonyloxy group, a $C_{1-12}$ aryloxycarbonyl group, a $C_{1-12}$ arylcarbonyloxy group and a substituted derivative thereof, a $C_{1-12}$ arylcarbamoyl group, and a $C_{1-12}$ arylcarbonylamino group and a substituted derivative thereof. When there are plural As, they may be the same or different. The above-mentioned A' is selected from the group consisting of, for example, halogen, a $C_{1-3}$ alkyl group, a halogenated $C_{1-3}$ alkyl group, a phenyl group, and a substituted phenyl group and when there are plural A's, they may be the same or different. A substituent on a phenyl ring of the substituted phenyl group can be, for example, halogen, a $C_{1-3}$ alkyl group, a halogenated $C_{1-3}$ alkyl group, or a combination thereof. The t is an integer from 0 to 4, and the z is an integer from 0 to 3.

Among the repeating units of the polyamide or polyester represented by the formula (22) above, the repeating unit represented by the general formula (23) below is preferable.

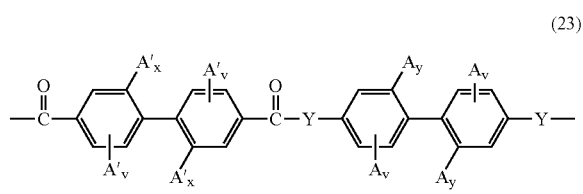

(23)

In the formula (23), A, A', and Y are those defined by the formula (22), and v is an integer from 0 to 3, preferably is an integer from 0 to 2. Although each of x and y is 0 or 1, not both of them are 0.

In the following, one example of a method of producing an optically compensating B-layer will be described.

First, one surface of the optically compensating A-layer or the base is coated with a solution or melt of the above-mentioned non-liquid crystalline polymer, thus forming a coating layer.

The solvent of the solution is not particularly limited as long as it can dissolve or suspend the non-liquid crystalline polymer, and can be selected suitably according to a kind of the non-liquid crystalline polymer. Examples thereof include halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachlorophenol; aromatic hydrocarbons such as benzene, toluene, xylene, methoxybenzene, and 1,2-dimethoxybenzene; ketones such as acetone, methyl ethyl ketone, methyl isobutyl ketone, cyclohexanone, cyclopentanone, 2-pyrrolidone, and N-methyl-2-pyrrolidone; esters such as ethyl acetate and butyl acetate; alcohols such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amides such as dimethylformamide and dimethylacetamide; nitriles such as acetonitrile and butyronitrile; ethers such as diethyl ether, dibutyl ether, and tetrahydrofuran; or carbon disulfide, ethyl cellosolve, or butyl cellosolve. In particular, methylene chloride, cyclohexanone, trichloroethylene, tetrachloroethane, N-methylpyrrolidone, tetrahydrofuran, and dimethylacetamide are preferable. These solvents may be used alone or in combination of two or more.

Considering a viscosity allowing an easy coating, it is appropriate to prepare the non-liquid crystalline polymer solution by mixing 2 to 100 parts by weight, preferably 5 to 50 parts by weight, and more preferably 10 to 40 parts by weight of the non-liquid crystalline polymer in 100 parts by weight of the solvent.

The melt of the non-liquid crystalline polymer can be prepared by heating the non-crystalline polymer.

The optically compensating B-layer further may contain an organic silicon compound. This compound allows an excellent adhesion to be achieved between the optically compensating B-layer and the optically compensating A-layer or between the optically compensating B-layer and the base. Accordingly, by using this compound, optically compensating layers with an improved adhesion can be formed easily. Thus, in the method of the present invention, an organic silicon compound may be added to the solution or melt of the non-crystalline polymer.

There is no particular limitation on the organic silicon compound, and it is possible to use, for example, tetramethoxysilane, methyltrimethoxysilane, dimethyldimethoxysilane, tetraethoxysilane, methyltriethoxysilane, dimethyldiethoxysilane, isobutyltrimethoxysilane, phenyltrimethoxysilane, phenyltriethoxysilane, diphenyldimethoxysilane, diphenyldiethoxysilane, 3-methacryloxypropyltrimethoxysilane, 3-methacryloxypropylmethyldimethoxysilane, 3-methacryloxypropyltriethoxysilane, 3-methacryloxypropylmethyldiethoxysilane, decyltrimethoxysilane, n-hexadecyltrimethoxysilane, n-hexadecyldimethoxymethylsilane, stearyltrimethoxysilane, vinyltrimethoxysilane, vinyltriethoxysilane, vinyltris(2-methoxyethoxy)silane, N-(2-aminoethyl)3-aminopropyltrimethoxysilane, N-(2-aminoethyl)3-aminopropylmethyldimethoxysilane, 3-aminopropyltrimethoxysilane, N-phenyl-3-aminopropyltrimethoxysilane, 3-mercaptopropyltrimethoxysilane, 3-chloropropyltrimethoxysilane, 3-chloropropylmethyldimethoxysilane, 3-methacryloxypropyltrimethoxysilane, 3-methacryloxypropylmethyldimethoxysilane, 3-methacryloxypropyltriethoxysilane, 3-methacryloxypropylmethyldiethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, and 2-(3,4-epoxydicyclohexyl)ethyltrimethoxysilane. They may be used alone or in combination of two or more and added in an amount ranging from 0.001 to 5 parts by weight with respect to 100 parts by weight of the polymer, for example. The added amount of 0.001 parts by weight or more further improves adhesiveness, while that of 5 parts by weight or less further improves heat resistance.

In the solution or melt of the non-liquid crystalline polymer, various additives such as a stabilizer, a plasticizer, metal and the like further may be blended as necessary.

Moreover, the solution or melt of the non-liquid crystalline polymer may contain other resins as long as the aligning property of the non-liquid crystalline polymer does not drop considerably. Such resins can be, for example, resins for general purpose use, engineering plastics, thermoplastic resins, and thermosetting resins.

The resins for general purpose use can be, for example, polyethylene (PE), polypropylene (PP), polystyrene (PS), polymethyl methacrylate (PMMA), an ABS resin, an AS resin, or the like. The engineering plastics can be, for example, polyacetate (POM), polycarbonate (PC), polyamide (PA: nylon), polyethylene terephthalate (PET), polybutylene terephthalate (PBT), or the like. The thermoplastic resins can be, for example, polyphenylene sulfide (PPS), polyethersulfone (PES), polyketone (PK), polyimide (PI), polycyclohexanedimethanol terephthalate (PCT), polyarylate (PAR), liquid crystal polymers (LCP), or the like. The thermosetting resins can be, for example, epoxy resins, phenolic novolac resins, or the like.

When the above-described other resins are blended in the solution or melt of the non-liquid crystalline polymer as mentioned above, the blend amount ranges, for example, from 0 wt % to 50 wt %, preferably from 0 wt % to 30 wt %, with respect to the non-liquid crystalline polymer.

Examples of a method of applying the solution or melt of the non-liquid crystalline polymer include methods capable of achieving a high thickness accuracy such as spin coating, flow-expanding, spraying, roller coating, flow coating, printing, dip coating, film flow-expanding, bar coating, and gravure printing.

Next, the coating layer is dried or cooled so as to obtain an optically compensating B-layer. When the solution of the non-liquid crystalline polymer is applied, the coating layer may be dried. A drying method is not particularly limited but can be air drying or heat drying, for example. The conditions therefor can be determined suitably according to, for example, kinds of the non-liquid crystalline polymer and the solvent. For instance, the temperature therefor usually is 25° C. to 400° C., preferably is 60° C. to 300° C., and further preferably is 100° C. to 200° C. The coating layer may be dried at a constant temperature or by gradually rising or lowering the temperature. The drying time also is not particularly limited but usually is 1 to 30 minutes, preferably 3 to 20 minutes, and further preferably 5 to 15 minutes.

On the other hand, when the melt of the non-liquid crystalline polymer is applied, the coating layer may be cooled. A cooling method is not particularly limited as long as the melt is hardened by the cooling, and the temperature or atmosphere therefore also in not particularly limited.

The optically compensating B-layer obtained by drying or cooling the coating layer of the non-liquid crystalline polymer may optionally be subjected to a treatment for aligning molecules of the non-liquid crystal polymer in the optically compensating B-layer. In the optically compensating B-layer thus treated, nx>ny>nz is satisfied so that Rz/Re can be reduced.

The above-described treatment for causing alignment can be carried out by extending and shrinking the optically compensating B-layer. The treatment for extending the optically compensating B-layer can be an ordinary stretching treatment. As the stretching treatment, one or more of suitable methods selected from biaxial stretching (sequential biaxial stretching, simultaneous biaxial stretching, etc.) and uniaxial stretching (free-end uniaxial stretching, fixed-end uniaxial stretching, etc.) may be used. However, uniaxial stretching is preferable because it can suppress the bowing phenomenon.

On the other hand, the treatment for shrinking the optically compensating B-layer can be carried out by using a base when forming the optically compensating B-layer. Specifically, the treatment can be carried out by coating the base with a non-liquid crystalline polymer and then heating or cooling the base, thereby causing the shrinkage of the base. As the base, a shrinkable base such as a heat shrinkable film or the like can be used. When using a shrinkable base, it is preferable to control the shrinkage of the base, specifically by setting a tenter stretching machine so that the stretch ratio of the film would be less than 1, or by setting an uniaxial-longitudinal stretching machine so that the stretch ratio of the film would be 1 to cause shrinkage in the width direction.

The base is not particularly limited, and may be formed of glass, an unstretched polymer as a material for the optically compensating A-layer, a liquid crystal polymer, plastic of an acrylic resin, an urethane resin, an epoxy resin, a silicone resin, polyester, polyarylate, polycarbonate, polysulfone, polyethersulfone, or polynorbornene.

After the non-liquid crystalline polymer film is formed on this base, this non-liquid crystalline polymer film may be transferred as an optically compensating B-layer onto the polarizing layer or the optically compensating A-layer. Alternatively, the laminate of the non-liquid crystalline polymer film and the base may be used as an optically compensating B-layer, without performing the transfer of the non-liquid crystalline polymer film.

In the above-described treatment for causing alignment, expanding and shrinking the laminate of the non-liquid crystalline polymer film and the base as a whole may cause retardation also in the base. In the case where it is not preferable that the optically compensating B-layer includes the base in which the retardation is caused, it is preferable to transfer only the non-liquid crystalline polymer film onto the polarizing film or the like and then remove the base. When the laminate of the non-liquid crystalline polymer film and the base is used as the optically compensating B-layer, the base preferably is a transparent polymer base.

The thickness of the thus-produced optically compensating B-layer is not particularly limited but may be, for example, 1 to 20 μm, preferably 1 to 15 μm, more preferably 1 to 12 μm, and still more preferably 2 to 10 μm.

In the above-described manner, the optically compensating B-layer formed of a non-liquid crystalline polymer is produced so as to satisfy the formulae (III) to (V) below.

$$1 \text{ (nm)} \leq Re_b \leq 100 \text{ (nm)} \tag{III}$$

$$5 \leq Rz_b/Re_b \leq 100 \tag{IV}$$

$$1 \text{ (μm)} \leq d_b \leq 20 \text{ (μm)} \tag{V}$$

When $Re_b$ satisfies the formula (III), it is possible to visually compensate the polarizing plate sufficiently, and when $Rz_b/Re_b$ satisfies the formula (IV), it is possible to compensate the birefringence of a liquid crystal cell sufficiently.

$Re_b$ in the formula (III) preferably satisfies $1 \text{ (nm)} \leq Re_b \leq 80 \text{ (nm)}$, more preferably $1 \text{ (nm)} \leq Re_b \leq 60 \text{ (nm)}$, and still more preferably $1 \text{ (nm)} \leq Re_b \leq 50 \text{ (nm)}$, because coloration can be suppressed over a wide viewing angle. Furthermore, $Rz_b/Re_b$ in the formula (IV) preferably satisfies $6 \leq Rz_b/Re_b \leq 80$, more preferably $7 \leq Rz_b/Re_b \leq 60$, and still more preferably $8 \leq Rz_b/Re_b \leq 50$, because the birefringence of a liquid crystal cell can be compensated when liquid crystal in the cell is in homeotropic alignment.

Anyone having an ordinary skill in the art can prepare a non-liquid crystalline polymer film satisfying the formulae (III) to (V), by setting the kind of non-liquid crystalline polymer etc. suitably, without conducting any undue experimentation.

For example, a non-liquid crystalline polymer film having a thickness of 0.5 to 10 μm obtained by applying polyimide as a non-liquid crystalline polymer satisfies the formulae (III) to (V) above.

Also, a non-liquid crystalline polymer film having a thickness of 1 to 20 μm obtained by applying polyetherketone as a non-liquid crystalline polymer satisfies the formulae (III) to (V) above.

The polarizing layer is not particularly limited but can be a film prepared by a conventionally known method of, for example, dyeing by allowing a film of various kinds to adsorb a dichroic material such as iodine or a dichroic dye, followed by crosslinking, stretching, and drying. Especially, films that transmit linearly polarized light when natural light is made to enter those films are preferable, and films having excellent light transmittance and polarization degree are preferable. Examples of the film of various kinds in which the dichroic material is to be adsorbed include hydrophilic polymer films such as polyvinyl alcohol (PVA)-based films, partially-formalized PVA-based films, partially-saponified films based on ethylene-vinyl acetate copolymer, and cellulose-based films. Other than the above, polyene aligned films such as dehydrated PVA and dehydrochlorinated polyvinyl chloride can be used, for example. Among them, the PVA-based film is preferable.

Though the thickness of the polarizing layer is not particularly limited, for example, it is from 1 µm to 80 µm, and preferably from 2 µm to 40 µm.

A transparent protective film functioning as a protective layer may be adhered to at least one surface of the polarizing layer (polarizing film) via a suitable adhesive layer.

The protective layer is not particularly limited but can be a conventionally known transparent film. For example, transparent protective films having excellent transparency, mechanical strength, thermal stability, moisture shielding property, and isotropism are preferable. Specific examples of materials for such a transparent protective layer include cellulose-based resins such as triacetylcellulose, and transparent resins based on polyester, polycarbonate, polyamide, polyimide, polyethersulfone, polysulfone, polystyrene, polynorbornene, polyolefin, acrylic substances, acetate, and the like. Thermosetting resins or ultraviolet-curing resins based on the acrylic substances, urethane, acrylic urethane, epoxy, silicones, and the like can be used as well. Among them, a TAC film having a surface saponified with alkali or the like is preferable in light of the polarization property and durability.

Moreover, for a protective film, the polymer film described in JP 2001-343529 A (WO 01/37007) also can be used. The polymer material used can be a resin composition containing a thermoplastic resin whose side chain has a substituted or unsubstituted imido group and a thermoplastic resin whose side chain has a substituted or unsubstituted phenyl group and nitrile group, for example, a resin composition containing an alternating copolymer of isobutene and N-methyl maleimide and an acrylonitrile-styrene copolymer. Alternatively, the polymer film may be formed by extruding the resin composition.

It is preferable that the protective layer is colorless. More specifically, a retardation value (Rz) of the film in its thickness direction as represented by the equation below preferably ranges from −90 nm to +75 nm, more preferably ranges from −80 nm to +60 nm, and particularly preferably ranges from −70 nm to +45 nm. When the retardation value is within the range of −90 nm to +75 nm, coloration (optical coloration) of the polarizing plate, which is caused by the protective layer, can be solved sufficiently. In the equation below, nx, ny, and nz respectively denote refractive indices of X-axis, Y-axis, and Z-axis. The X-axis direction is an axial direction exhibiting a maximum refractive index within a plane of the protective layer, the Y-axis direction is an axial direction perpendicular to the X-axis within the plane, the Z-axis direction is a thickness direction perpendicular to the X-axis and the Y-axis, and d represents a thickness of the protective layer.

$$Rz = \{[(nx+ny)/2]-nz\} \cdot d$$

The transparent protective layer further may have an optically compensating function. As such a transparent protective layer having the optically compensating function, it is possible to use, for example, a known layer used for preventing coloration caused by changes in a visible angle based on retardation in a liquid crystal cell or for widening a preferable viewing angle. Specific examples include various stretched films obtained by stretching the above-described transparent resins uniaxially or biaxially, an alignment film of a liquid crystal polymer or the like, and a laminate obtained by providing an alignment layer of a liquid crystal polymer on a transparent base. Among the above, the alignment film of a liquid crystal polymer is preferable because a wide viewing angle with excellent visibility can be achieved. Particularly preferable is an optically compensating retardation plate obtained by supporting an optically compensating layer with the above-mentioned triacetylcellulose film or the like, where the optically compensating layer is made of an incline-alignment layer of a discotic or nematic liquid crystal polymer. This optically compensating retardation plate can be a commercially available product, for example, "WV film" manufactured by Fuji Photo Film Co., Ltd. Alternatively, the optically compensating retardation plate can be prepared by laminating two or more layers of the retardation film and the film support of triacetylcellulose film or the like so as to control the optical characteristics such as retardation.

The thickness of the transparent protective layer is not particularly limited but can be determined suitably according to retardation or a protective strength, for example. In general, the thickness of the transparent protective layer is not more than 200 µm, preferably in the range from 5 µm to 150 µm, and more preferably in the range from 10 µm to 100 µm.

The transparent protective layer can be formed suitably by a conventionally known method such as a method of coating a polarizing film with the above-mentioned various transparent resins or a method of laminating the transparent resin film, the optically compensating retardation plate or the like on the polarizing film, or can be a commercially available product.

The transparent protective layer further may be subjected to, for example, a hard coating treatment, an antireflection treatment, treatments for anti-sticking, diffusion, and anti-glaring, and the like. The hard coating treatment aims to prevent scratches on the surfaces of the polarizing plate, and is a treatment of, for example, providing a hardened coating film that is formed of a curable resin and has excellent hardness and smoothness onto a surface of the transparent protective layer. The curable resin can be, for example, ultraviolet-curing resins of silicone base, urethane base, acrylic, and epoxy base. The treatment can be carried out by a conventionally known method. The anti-sticking treatment aims to prevent adjacent layers from sticking to each other. The antireflection treatment aims to prevent reflection of external light on the surface of the polarizing plate, and can be carried out by forming a conventionally known antireflection layer or the like.

The anti-glare treatment aims to prevent reflection of external light on the polarizing plate surface from hindering visibility of light transmitted through the polarizing plate. The anti-glare treatment can be carried out, for example, by providing microscopic asperities on a surface of the transparent protective layer by a conventionally known method. Such microscopic asperities can be provided, for example, by roughening the surface by sand-blasting or embossing, or by blending transparent fine particles in the above-described transparent resin when forming the transparent protective layer.

The above-described transparent fine particles may be silica, alumina, titania, zirconia, stannic oxide, indium oxide, cadmium oxide, antimony oxide, or the like. Other than the above, inorganic fine particles having an electrical conductivity or organic fine particles including, for example, crosslinked or uncrosslinked polymer particles can be used as well. The average particle diameter of the transparent fine particles ranges, for example, from 0.5 to 20 µm, though there is no specific limitation. In general, a blend ratio of the transparent fine particles preferably ranges from 2 to 70 parts by weight, and more preferably ranges from 5 to 50 parts by weight with respect to 100 parts by weight of the above-described transparent resin, though there is no specific limitation.

An anti-glare layer in which the transparent fine particles are blended can be used as the transparent protective layer itself or provided as a coating layer or the like applied onto the transparent protective layer surface. Furthermore, the anti-glare layer also can function as a diffusion layer to diffuse light transmitted through the polarizing plate in order to widen the viewing angle (i.e., visually-compensating function).

The antireflection layer, the anti-sticking layer, the diffusion layer, and the anti-glare layer mentioned above can be laminated on the polarizing plate, as a sheet of optical layers comprising these layers, separately from the transparent protective layer.

When transparent protective films are formed on both surfaces of the polarizing layer, the films can contain polymers different from each other. Alternatively, the optically compensating A-layer or the base of the optically compensating B-layer can be used as a protective film on one surface of the polarizing plate. Such a configuration is preferred since it is possible to reduce the thickness of the layer.

The method of laminating the polarizing layer and the transparent protective film as a protective layer is not particularly limited but a conventionally known method can be applied. In general, the kinds can be determined suitably depending on the materials or the like of the components. Examples of the adhesives include polymer adhesives based on acrylic substances, vinyl alcohol, silicone, polyester, polyurethane, polyester, or the like and rubber-based adhesives. The above-mentioned pressure-sensitive adhesives and adhesives do not peel off easily even when being exposed to moisture or heat, for example, and have excellent light transmittance and polarization degree.

More specifically, PVA adhesives are preferable when the polarizing layer is a PVA-based film, in light of stability of adhering treatment. These adhesive and pressure-sensitive adhesive may be applied directly to surfaces of the polarizing layer and the transparent protective layer, or a layer of a tape or a sheet formed of the adhesive or pressure-sensitive adhesive may be arranged on the surfaces thereof. Further, when these adhesives are prepared as an aqueous solution, for example, other additives or a catalyst such as an acid catalyst may be blended as necessary.

Though the thickness of the adhesive layer is not particularly limited, for example, it is from 1 nm to 500 nm, preferably from 10 nm to 300 nm, and more preferably from 20 nm to 100 nm.

By laminating the above-mentioned polarizing layer, the optically compensating A-layer, and the optically compensating B-layer, a polarizing plate with optical compensation function according to the present invention can be produced.

The method of laminating the polarizing layer, the optically compensating A-layer, and the optically compensating B-layer is not particularly limited, but conventionally known methods can be applied. Examples of the method include preparing the polarizing layer, the optically compensating A-layer, and the optically compensating B-layer separately and then laminating these layers. In this lamination method, the pressure-sensitive adhesive and the adhesive as mentioned above can be used without any particular limitations. When the optically compensating B-layer is formed separately on a base, the base may be included in the laminate, or the base may be removed after the lamination (i.e., transfer).

Alternative methods of laminating the polarizing layer, the optically compensating A-layer, and the optically compensating B-layer include, for example, (1) manufacturing previously a laminate (film) of an optically compensating A-layer and a polarizing layer, and further laminating an optically compensating B-layer thereon; (2) manufacturing previously a laminate of an optically compensating B-layer and a polarizing layer (film), and further laminating an optically compensating A-layer thereon; and (3) laminating an optically compensating A-layer and an optically compensating B-layer previously to form optically compensating layers, and further laminating a polarizing layer (film) on the optically compensating layers.

The method of manufacturing the laminate of the polarizing layer (film) and the optically compensating A-layer in the above-mentioned (1) is not particularly limited, but conventionally known methods can be applied. In general, the above-mentioned pressure-sensitive adhesive and the adhesive can be used, and the type thereof can be determined suitably depending on the materials or the like of the respective components. For example, the polarizing layer and the optically compensating A-layer prepared separately can be laminated by using a pressure-sensitive adhesive or an adhesive.

The method of further laminating the optically compensating B-layer on the laminate including the polarizing layer and the optically compensating A-layer can be selected from (a) forming the optically compensating B-layer directly on the optically compensating A-layer and (b) forming the optically compensating B-layer on a base separately prepared, and transferring the optically compensating B-layer onto the optically compensating A-layer via an adhesive or a pressure-sensitive adhesive. When applying the method (b), the base may be removed or maintained after transferring the optically compensating B-layer.

Next, the method of further laminating the optically compensating A-layer on the laminate of the optically compensating B-layer and the polarizing layer (film) as shown in (2) will be explained. The method of manufacturing the laminate of the optically compensating B-layer and the polarizing layer is not particularly limited, but the above-mentioned conventional methods can be applied. The examples are: (a) forming the optically compensating B-layer directly on the polarizing layer and (b) forming the optically compensating B-layer directly on a base separately prepared, and transferring the optically compensating B-layer onto the polarizing layer via an adhesive or a pressure-sensitive adhesive. When using the method (b), the base may be removed or maintained after transferring the optically compensating B-layer.

The method of further laminating the optically compensating A-layer on the laminate including the polarizing layer and the optically compensating B-layer is not particularly limited, but the above-mentioned conventionally known methods can be applied.

The following description is about the method of forming the optically compensating layers by previously laminating the optically compensating A-layer and the optically compensating B-layer, and further laminating the polarizing layer (film) on the optically compensating layers, as shown in (3).

The method of previously laminating the optically compensating A-layer and the optically compensating B-layer can be selected from (a) forming the optically compensating B-layer directly on the optically compensating A-layer and (b) forming the optically compensating B-layer on a base separately prepared, and transferring the optically compensating B-layer onto the optically compensating A-layer via an adhesive or a pressure-sensitive adhesive. When using the method (b), the base may be removed or maintained after transferring the optically compensating B-layer.

The method of laminating on the polarizing layer (film) the laminate including the optically compensating A-layer and the optically compensating B-layer is not particularly limited, but the above-mentioned conventionally known methods can be applied. When laminating on the polarizing layer the laminate including the optically compensating A-layer and the optically compensating B-layer, either of the optically compensating A-layer or the optically compensating B-layer may face the polarizing layer.

Next, specific embodiments for polarizing plates with optical compensation function according to the present invention will be described by referring to cross-sectional views shown in FIGS. 1 to 11.

Figure 2:
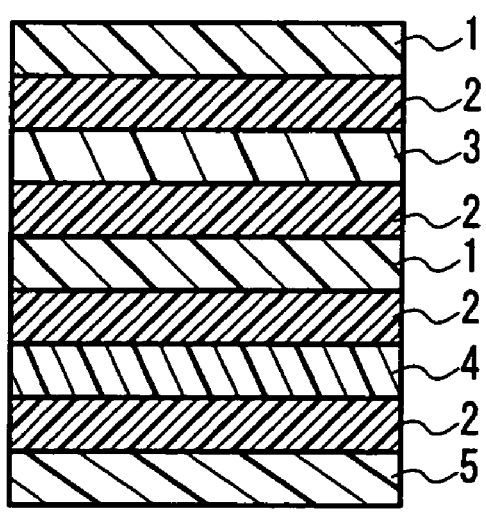
FIG. 2 is a schematic cross-sectional view showing another example of a polarizing plate with optical compensation function according to the present invention.

FIG. 1 shows a polarizing plate with optical compensation function according to the present invention having the following configuration. On both surfaces of a polarizing layer 3, protective layers 1 are laminated via adhesive layers 2, respectively. On one surface of one of the protective layers 1, an optically compensating A-layer 4 is laminated via an adhesive layer 2. On this optically compensating A-layer 4, an optically compensating B-layer 5, which is formed on a base 6, further is laminated via an adhesive layer 2. FIG. 2 shows an example of a polarizing plate with optical compensation function according to the present invention obtained by removing the base 6 from the polarizing plate shown in FIG. 1.

Figure 3:
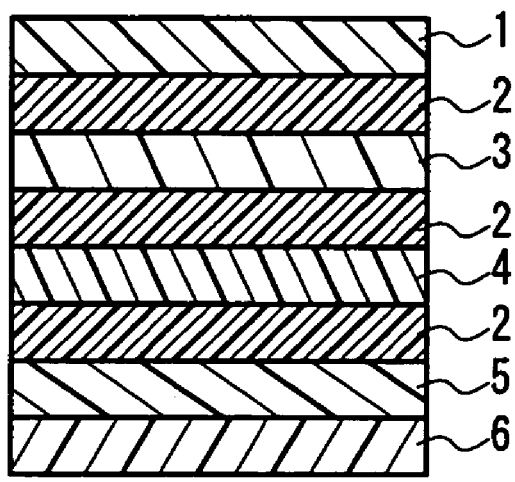
FIG. 3 is a schematic cross-sectional view showing still another example of a polarizing plate with optical compensation function according to the present invention.
Figure 4:
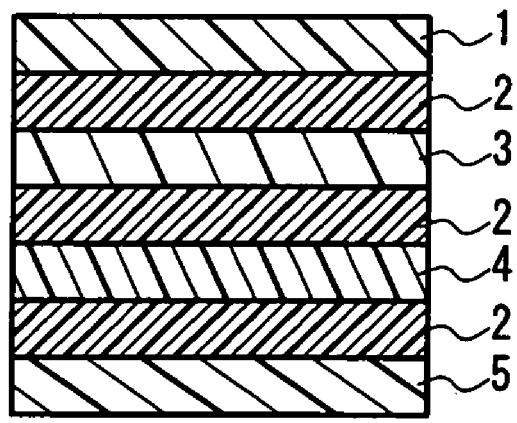
FIG. 4 is a schematic cross-sectional view showing still another example of a polarizing plate with optical compensation function according to the present invention.

FIG. 3 shows a polarizing plate with optical compensation function according to the present invention having the following configuration. On one surface of a polarizing layer 3, a protective layer 1 is laminated via an adhesive layer 2. On the other surface of the polarizing layer 3, an optically compensating A-layer 4 is laminated via an adhesive layer 2. Furthermore, on the other surface of the optically compensating A-layer 4, an optically compensating B-layer 5, which is formed on a base 6, further is laminated via an adhesive layer 2. FIG. 4 shows an example of a polarizing plate with optical compensation function according to the present invention obtained by removing the base 6 from the polarizing plate shown in FIG. 3.

Figure 5:
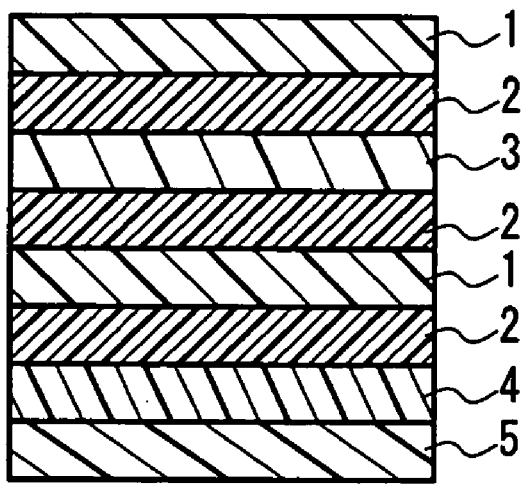
FIG. 5 is a schematic cross-sectional view showing still another example of a polarizing plate with optical compensation function according to the present invention.

FIG. 5 shows a polarizing plate with optical compensation function according to the present invention having the following configuration. On both surfaces of a polarizing layer 3, protective layers 1 are laminated via adhesive layers 2, respectively. On one surface of one of the protective layers 1, an optically compensating A-layer 4 is laminated via an adhesive layer 2. On this optically compensating A-layer 4, an optically compensating B-layer 5 is formed directly.

Figure 6:
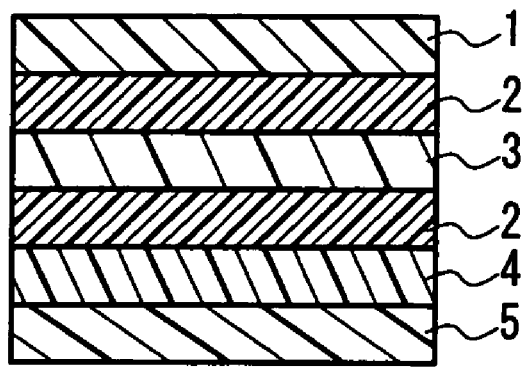
FIG. 6 is a schematic cross-sectional view showing still another example of a polarizing plate with optical compensation function according to the present invention.

FIG. 6 shows a polarizing plate with optical compensation function according to the present invention having the following configuration. On one surface of a polarizing layer 3, a protective layer 1 is laminated via an adhesive layer 2. On the other surface of the polarizing layer 3, an optically compensating A-layer 4 is laminated via an adhesive layer 2. On this optically compensating A-layer 4, an optically compensating B-layer 5 is formed directly.

Figure 7:
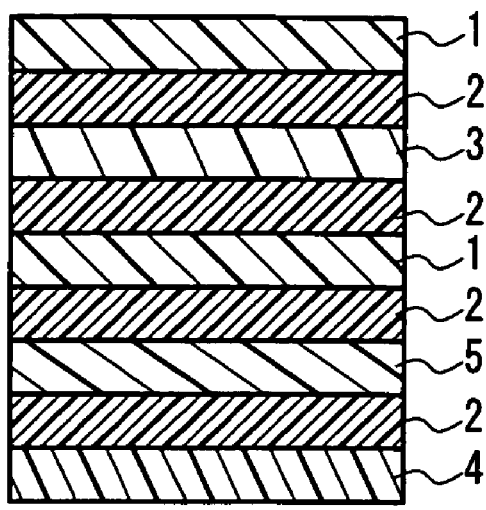
FIG. 7 is a schematic cross-sectional view showing still another example of a polarizing plate with optical compensation function according to the present invention.

FIG. 7 shows a polarizing plate with optical compensation function according to the present invention having the following configuration. On both surfaces of a polarizing layer 3, protective layers 1 are laminated via adhesive layers 2, respectively. On one surface of one of the protective layers 1, an optically compensating B-layer 5, which is formed on a base (not shown), is laminated via an adhesive layer 2 and the base is removed after the lamination. On this optically compensating B-layer 5, an optically compensating A-layer 4 further is laminated via an adhesive layer 2.

Figure 8:
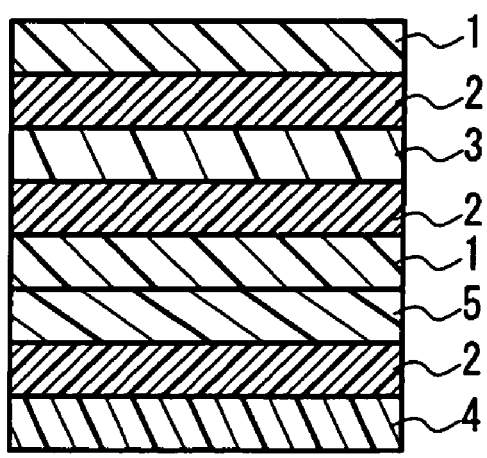
FIG. 8 is a schematic cross-sectional view showing still another example of a polarizing plate with optical compensation function according to the present invention.

FIG. 8 shows a polarizing plate with optical compensation function according to the present invention having the following configuration. On both surfaces of a polarizing layer 3, protective layers 1 are laminated via adhesive layers 2, respectively. On one surface of one of the protective layers 1, an optically compensating B-layer 5 is formed directly. On this optically compensating B-layer 5, an optically compensating A-layer 4 further is laminated via an adhesive layer 2.

Figure 9:
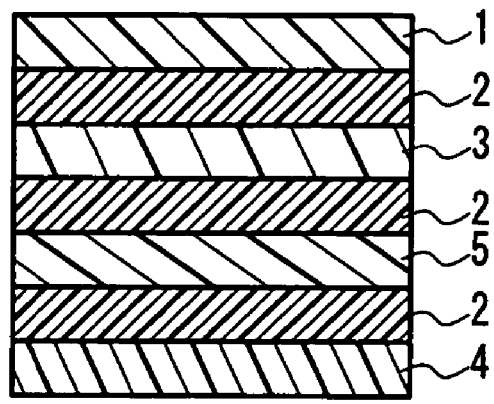
FIG. 9 is a schematic cross-sectional view showing still another example of a polarizing plate with optical compensation function according to the present invention.

FIG. 9 shows a polarizing plate with optical compensation function according to the present invention having the following configuration. On an optically compensating A-layer 4, an optically compensating B-layer 5, which is formed on a base (not shown), is laminated via an adhesive layer 2 and the base is removed after the lamination. The thus-obtained laminate is laminated on one surface of a polarizing layer 3 via an adhesive layer 2 so that the optically compensating B-layer in the laminate faces the polarizing layer 3. On the other surface of the polarizing layer 3, a protective layer 1 is laminated via an adhesive layer 2.

Figure 10:
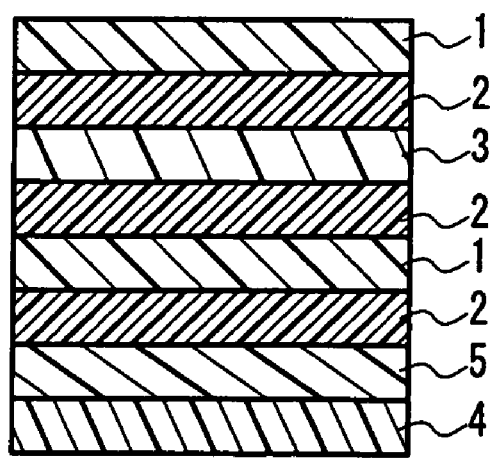
FIG. 10 is a schematic cross-sectional view showing still another example of a polarizing plate with optical compensation function according to the present invention.
Figure 11:
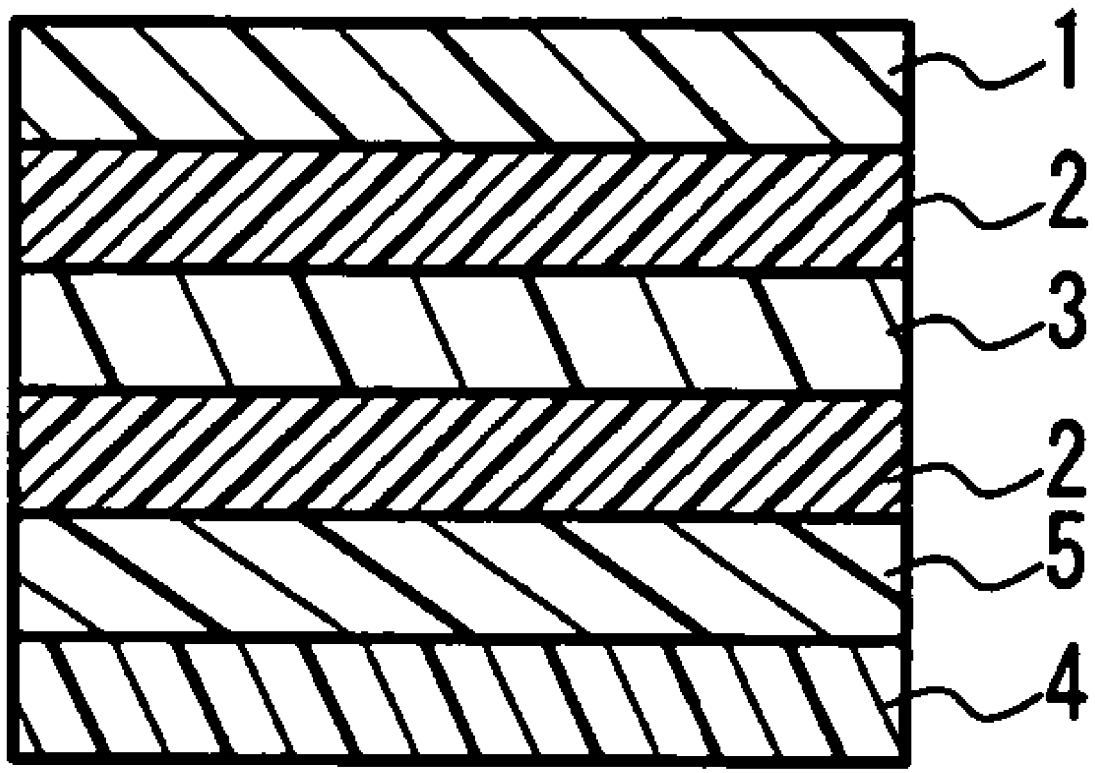
FIG. 11 is a schematic cross-sectional view showing still another example of a polarizing plate with optical compensation function according to the present invention.

FIG. 10 shows a polarizing plate with optical compensation function according to the present invention having the following configuration. On an optically compensating A-layer 4, an optically compensating B-layer 5 is formed directly, thereby producing a laminate. On the other hand, on both surfaces of a polarizing layer 3, protective layers 1 are laminated via adhesive layers 2, respectively. On one surface of one of the protective layers 1, the laminate is laminated via an adhesive layer 2 so that the optically compensating B-layer 5 faces the protective layer 1. FIG. 11 shows an example where a laminate produced in the same manner as in the above is laminated on one surface of a polarizing layer 3 via an adhesive layer 2 while a protective layer 1 is laminated on the other surface of the polarizing layer 3 via an adhesive layer 2. In this example, the laminate is laminated so that the optically compensating B-layer 5 faces the polarizing layer 3.

The polarizing plate with optical compensation function according to the present invention can include in use an additional optical layer(s) together with the polarizing plate of the present invention. Examples of the optical layer include various optical layers that have been conventionally known and used for forming liquid crystal displays or the like, such as a polarizing plate, a reflection plate, a semi-transparent reflection plate, and a brightness-enhancement film as mentioned below. These optical layers can be used alone or in combination of at least two kinds of layers. Such an optical layer can be provided as a single layer, or at least two optical layers can be laminated. A polarizing plate with optical compensation function, which further includes such an optical layer(s), is used preferably as an integrated polarizing plate with optical compensation function, and it can be arranged on a surface of a liquid crystal cell, for example, so as to be used suitably for various image displays.

Such an integrated polarizing plate will be described below.

First, an example of a reflective polarizing plate or a semitransparent reflective polarizing plate will be described. The reflective polarizing plate is prepared by further laminating a reflection plate on a polarizing plate with optical compensation function according to the present invention, and the semitransparent reflective polarizing plate is prepared by further laminating a semitransparent reflection plate on a polarizing plate with optical compensation function according to the present invention.

In general, such a reflective polarizing plate is arranged on a backside of a liquid crystal cell in order to make a liquid crystal display (reflective liquid crystal display) that reflects incident light from a visible side (display side). The reflective polarizing plate is advantageous in that, for example, it allows the liquid crystal display to be thinned further because the necessity of providing a light source such as backlight can be eliminated.

The reflective polarizing plate can be formed in any conventionally known manner such as forming a reflection plate of metal or the like on one surface of a polarizing plate having a certain elastic modulus. More specifically, one example thereof is a reflective polarizing plate formed by matting one surface (surface to be exposed) of a transparent protective layer of the polarizing plate as required, and providing the surface with a deposited film or a metal foil formed of a reflective metal such as aluminum.

Another example is a reflective polarizing plate prepared by forming, on a transparent protective layer having a surface with microscopic asperities due to microparticles contained in various transparent resins, a reflection plate corresponding to the microscopic asperities. The reflection plate having a surface with microscopic asperities diffuses incident light irregularly so that directivity and glare can be prevented and irregularity in color tones can be controlled. The reflection plate can be formed by attaching the metal foil or the metal deposited film directly on the surface with asperities of the transparent protective layer by any conventionally known methods including deposition and plating, such as vacuum deposition, ion plating, and sputtering.

As mentioned above, the reflection plate can be formed directly on a transparent protective layer of a polarizing plate. Alternatively, a reflecting sheet or the like formed by providing a reflecting layer on a proper film such as the transparent protective film can be used as the reflection plate. Since a typical reflecting layer of a reflection plate is made of a metal, it is preferably used in a state that the reflecting surface of the reflecting layer is coated with the film, a polarizing plate, or the like, in order to prevent a reduction of the reflectance due to oxidation, and furthermore, to allow the initial reflectance to be maintained for a long period and to avoid the necessity of forming a transparent protective layer separately.

On the other hand, a semitransparent polarizing plate is provided by replacing the reflection plate in the above-mentioned reflective polarizing plate by a semitransparent reflection plate. Examples of a semitransparent polarizing plate include a half mirror that reflects and transmits light at the reflecting layer.

In general, such a semitransparent polarizing plate is arranged on a backside of a liquid crystal cell. In a liquid crystal display including the semitransparent polarizing plate, incident light from the visible side (display side) is reflected to display an image when a liquid crystal display is used in a relatively bright atmosphere, while in a relatively dark atmosphere, an image is displayed by using a built-in light source such as a backlight on the backside of the semitransparent polarizing plate. In other words, the semitransparent polarizing plate can be used to form a liquid crystal display that can save energy for a light source such as a backlight under a bright atmosphere, while a built-in light source can be used under a relatively dark atmosphere.

The following description is about an example of a polarizing plate prepared by further laminating a brightness-enhancement film on a polarizing plate with optical compensation function according to the present invention.

A suitable example of the brightness-enhancement film is not particularly limited, but it can be selected from a multilayer thin film of a dielectric or a laminate of multiple thin films with varied refraction aeolotropy that transmits linearly polarized light having a predetermined polarization axis while reflecting other light. Examples of such a brightness-enhancement film include "D-BEF (trade name)" manufactured by 3M Co. Also, a cholesteric liquid crystal layer, more specifically, an alignment film of a cholesteric liquid crystal polymer or an alignment liquid crystal layer fixed onto a supportive film base can be used as a brightness-enhancement film. Such a brightness-enhancement film reflects either clockwise or counterclockwise circularly polarized light while it transmits other light. Examples of such a brightness-enhancement film include "PCF 350 (trade name)" manufactured by Nitto Denko Corporation, "Transmax (trade name)" manufactured by Merck and Co., Inc., and the like.

An example of the various polarizing plates of the present invention can be an optical member including two or more optical layers, which is formed by laminating an additional optical layer(s) and the above-mentioned laminated polarizing plate including a birefringent layer.

An optical member including a laminate of at least two optical layers can be formed, for example, by a method of laminating layers separately in a certain order in the process for manufacturing a liquid crystal display or the like. However, efficiency in manufacturing a liquid crystal display or the like can be improved by using an optical member that has been laminated previously because of its excellent stability in quality, assembling operability, and the like. Any appropriate adhesion means such as a pressure-sensitive adhesive layer can be used for lamination as in the above.

Moreover, it is preferable that the polarizing plate with optical compensation function according to the present invention further has a pressure-sensitive adhesive layer or an adhesive layer so as to allow easier lamination onto the other members such as a liquid crystal cell. They can be arranged on one surface or both surfaces of the polarizing plate. The material for the pressure-sensitive adhesive layer is not particularly limited but can be a conventionally known material such as acrylic polymers. In particular, the pressure-sensitive adhesive layer having a low moisture absorption coefficient and an excellent thermal resistance is preferable from the aspects of prevention of foaming or peeling caused by moisture absorption, prevention of degradation in the optical characteristics and warping of a liquid crystal cell caused by difference in thermal expansion coefficients, a capability of forming a liquid crystal display with high quality and excellent durability, and the like. It also may be possible to incorporate fine particles so as to form the pressure-sensitive adhesive layer showing light diffusion property. For the purpose of forming the pressure-sensitive adhesive layer on the surface of the polarizing plate, a solution or melt of a sticking material can be applied directly on a predetermined surface of the polarizing plate by a development method such as flow-expansion and coating. Alternatively, a pressure-sensitive adhesive layer can be formed on a separator, which will be described below, in the same manner and transferred to a predetermined surface of the polarizing plate. Such a layer can be formed on any surface of the polarizing plate. For example, it can be formed on an exposed surface of the optically compensation layer of the polarizing plate.

In the case where a surface of a pressure-sensitive adhesive layer or the like provided on the polarizing plate is exposed, it is preferable to cover the surface with a separator so as to prevent contamination until the pressure-sensitive adhesive layer is put to use. The separator can be made of a suitable film, e.g., the above-mentioned transparent protective film, coated with a peeling agent if required. The peeling agent may be selected, for example, from a silicone-based agent, a long-chain alkyl-based agent, a fluorine-based agent, an agent containing molybdenum sulfide, or the like.

The pressure-sensitive adhesive layer can be a monolayer or a laminate. The laminate can include monolayers different from each other in the type or in the compositions. When arranged on both surfaces of the polarizing plate, the pressure-sensitive adhesive layers can be same or can be different from each other in the type or in the compositions.

The thickness of the pressure-sensitive adhesive layer can be determined suitably depending on the constituents or the like of the polarizing plate. In general, the thickness of the pressure-sensitive adhesive layer is 1 µm to 500 µm.

It is preferable that the pressure-sensitive adhesive layer is made of a pressure-sensitive adhesive having excellent optical transparency and appropriate sticking characteristics such as wettability, cohesiveness, and adhesiveness. The pressure-sensitive adhesive can be prepared appropriately based on polymers such as an acrylic polymer, a silicone-based polymer, polyester, polyurethane, polyether, and synthetic rubber.

Sticking characteristics of the pressure-sensitive adhesive layer can be controlled suitably by a conventionally known method. For example, the degree of cross-linkage and the molecular weight will be adjusted on the basis of a composition or molecular weight of the base polymer for forming the pressure-sensitive adhesive, a cross-linking method, a content ratio of the crosslinkable functional group, and a ratio of the blended cross-linking agent.

The polarizing plate with optical compensation function according to the present invention and other layers for composing various optical members (various polarizing plates including an additional optical layer(s)), such as the polarizing film, the transparent protective film, the optical layer, and the pressure-sensitive adhesive layer may be treated with an UV absorber such as salicylate ester compounds, benzophenone compounds, benzotriazole compounds, cyanoacrylate compounds, or nickel complex salt-based compounds, thus providing an UV absorbing capability.

As mentioned above, polarizing plates with optical compensation function according to the present invention can be used preferably for forming various devices such as liquid crystal displays. For example, a polarizing plate is arranged on at least one surface of a liquid crystal cell in order to form a liquid crystal panel used in a reflection-type, semi-transmission-type, or transmission and reflection type liquid crystal display.

A liquid crystal cell to compose the liquid crystal display can be selected arbitrarily. For example, it is possible to use various liquid crystal cells such as active matrix driving type represented by a thin film transistor type, a simple matrix driving type represented by a twist nematic type and a super twist nematic type. Since the polarizing plates with optical compensation function according to the present invention are excellent particularly in optical compensation of a VA (Vertical Aligned) cell, they are used particularly preferably for viewing-angle compensating films for VA mode liquid crystal displays.

In general, a typical liquid crystal cell is composed of opposing liquid crystal cell substrates and liquid crystal injected into a space between the substrates. The liquid crystal cell substrates can be made of glass, plastics, or the like without any particular limitations. Materials for the plastic substrates can be selected from conventionally known materials without any particular limitations.

When polarizing plates or optical members are arranged on both surfaces of a liquid crystal cell, the polarizing plates or the optical members on the surfaces can be the same or different type. Moreover, for forming a liquid crystal display, one or more layers of appropriate members such as a prism array sheet, a lens array sheet, an optical diffuser, and a backlight can be arranged at proper positions.

The liquid crystal display according to the present invention is not particularly limited as long as it includes a polarizing plate with optical compensation function according to the present invention as the polarizing plate. When it includes further a light source, preferably, the light source is a flat light source emitting polarized light for enabling effective use of light energy, though there is no particular limitation.

For the liquid crystal display according to the present invention, it also is possible to further dispose a diffusion plate, an anti-glare layer, an antireflection film, a protective layer/plate, on an optical film (polarizing plate) on the viewing side. Alternatively, a retardation plate for compensation or the like can be disposed suitably between a liquid crystal cell and a polarizing plate in the liquid crystal panel.

The polarizing plate with optical compensation function according to the present invention can be used not only in the above-described liquid crystal display but also in, for example, self-light-emitting image displays such as an organic electroluminescence (EL) display, a plasma display (PD), and a field emission display (FED).

The following is a specific description of an electroluminescence (EL) display including a polarizing plate with optical compensation function according to the present invention. The EL display of the present invention is a display having the polarizing plate with optical compensation function according to the present invention, and can be either an organic EL display or an inorganic EL display.

In recent EL displays, for preventing reflection from an electrode in a black state, use of an optical film such as a polarizing layer and a polarizing plate as well as a λ/4 plate is proposed. The polarizing plate with optical compensation function according to the present invention are especially useful when linearly polarized light, circularly polarized light, or elliptically polarized light is emitted from an EL layer. The polarizing plate with optical compensation function according to the present invention is especially useful even when an oblique light beam is partially polarized even in the case where natural light is emitted in a front direction.

First, a typical organic EL display will be explained below. In general, such an organic EL display has a luminant (organic EL luminant) that is prepared by laminating a transparent electrode, an organic ruminant layer, and a metal electrode in this order on a transparent substrate. Here, the organic ruminant layer is a laminate of various organic thin films. Examples thereof include various combinations such as a laminate of a hole injection layer made of a triphenylamine derivative or the like and a luminant layer made of a phosphorous organic solid such as anthracene; a laminate of the ruminant layer and an electron injection layer made of a perylene derivative or the like; and a laminate of the hole injection layer, the luminant layer, and the electron injection layer.

In general, the organic EL display emits light on the following principle: a voltage is applied to the anode and the cathode so as to inject holes and electrons into the organic ruminant layer, energy generated by the re-bonding of these holes and electrons excites the phosphor, and the excited phosphor emits light when it returns to the basis state. The mechanism of the re-bonding of these holes and electrons during the process is similar to that of an ordinary diode. This implies that current and the light emitting intensity exhibit a considerable nonlinearity accompanied with a rectification with respect to the applied voltage.

It is preferred for the organic EL display that at least one of the electrodes is transparent so as to obtain luminescence at the organic luminant layer. In general, a transparent electrode of a transparent conductive material such as indium tin oxide (ITO) is used for the anode. Use of substances having small work function for the cathode is important for facilitating the electron injection and thereby raising luminous efficiency, and in general, metal electrodes such as Mg—Ag and Al—Li can be used.

In an organic EL display configured as described above, it is preferable that the organic ruminant layer is made of a film that is extremely thin such as about 10 nm, so that the organic ruminant layer can transmit substantially whole light as the transparent electrode does. As a result, when the layer does not illuminate, a light beam entering from the surface of the transparent substrate passes through the transparent electrode and the organic ruminant layer and is reflected at the metal electrode so that it comes out again to the surface of the transparent substrate. Thereby, the display surface of the organic EL display looks like a mirror when viewed from exterior.

In an organic EL display according to the present invention including an organic EL luminant having a transparent electrode on the surface side of an organic luminant layer and a metal electrode on the back surface of the organic luminant layer, for example, it is preferable that a polarizing plate with optical compensation function according to the present invention is arranged on the surface of the transparent electrode, and furthermore, a λ/4 plate is arranged between the polarizing plate and an EL element. As described above, an organic EL display obtained by arranging a polarizing plate with optical compensation function according to the present invention can suppress external reflection and improve the visibility. It is further preferable that a retardation plate is arranged between the transparent electrode and an optical film.

The retardation plate and the polarizing plate with optical compensation function polarize, for example, light which enters from outside and is reflected by the metal electrode, and thus the polarization has an effect that the mirror of the metal electrode cannot be viewed from exterior. Particularly, the mirror of the metal electrode can be blocked completely by forming the retardation plate with a quarter wavelength plate and adjusting an angle formed by the polarization directions of the retardation plate and the polarizing plate to be π/4. That is, the polarizing plate transmits only the linearly polarized light component among the external light entering the organic EL display. In general, the linearly polarized light is changed into elliptically polarized light by the retardation plate. When the retardation plate is a quarter wavelength plate and besides the angle is π/4, the light is changed into circularly polarized light.

This circularly polarized light passes through, for example, the transparent substrate, the transparent electrode, and the organic thin film. After being reflected by the metal electrode, the light passes again through the organic thin film, the transparent electrode, and the transparent substrate, and turns into linearly polarized light at the retardation plate. Moreover, since the linearly polarized light crosses the polarization direction of the polarizing plate at a right angle, it cannot pass through the polarizing plate. Consequently, as described above, the mirror of the metal electrode can be blocked completely.

EXAMPLES

The following is a more specific description of the present invention by way of examples and comparative examples, though the present invention is by no means limited to the examples below.

An 80 μm thick polyvinyl alcohol (PVA) film was immersed to dye in an aqueous solution containing 0.05 wt % of iodine at 30° C. for 60 seconds. Subsequently, the film was stretched to 5 times its original length while being immersed in an aqueous solution containing 4 wt % of boric acid for 60 seconds. After that, the film was dried at 50° C. for 4 minutes to obtain a 20 μm thick polarizing layer. On each side of this polarizing layer, an 80 μm thick triacetylcellulose (TAC) film was bonded via a 5 μm thick PVA-based adhesive, thereby obtaining a polarizing plate.

Example 1

A 100 μm thick norbornene resin film (ARTON; manufactured by JSR Corporation) was stretched transversely with a tenter to 1.25 times its original length at 175° C., thereby obtaining an 80 μm thick stretched film (an optically compensating A-layer). This stretched film was bonded to one surface of a polarizing plate obtained as above via a 25 μm thick acrylic pressure-sensitive adhesive layer.

Polyimide was first synthesized from 2,2'-bis(3,4-dicarboxyphenyl)-hexafluoropropane and 2,2'-bis(trifluoromethyl)-4,4'-diaminobiphenyl and then dissolved in cyclohexanone to prepare a 15 wt % solution of this polyimide. This polyimide solution was applied onto a biaxially-stretched polyester film (a base), followed by drying at 120° C. for 10 minutes. Thus, a 5 μm thick non-liquid crystalline polymer layer (an optically compensating B-layer) was formed.

The laminate of the polarizing plate and the optically compensating A-layer and the laminate of the base and the optically compensating B-layer were bonded via a 15 μm thick acrylic pressure-sensitive adhesive so that the optically compensating A-layer faced the optically compensating B-layer. Thereafter, the base was removed. Thus, a polarizing plate (No. 1) with optical compensation function having a total thickness of 315 μm was obtained.

Example 2

A 100 μm thick norbornene resin film was stretched in the longitudinal direction to 1.2 times its original length at 180° C., thereby obtaining a 90 μm thick stretched film (an optically compensating A-layer).

The same polyimide solution as in Example 1 was applied onto an 80 μm thick TAC film (a base), followed by drying at 120° C. for 10 minutes. Thus, a 5 μm thick non-liquid crystalline polymer layer (an optically compensating B-layer) was formed.

This optically compensating B-layer was bonded to one surface of a polarizing layer obtained as above via a 5 μm thick PVA-based adhesive so that the base faced the polarizing layer. It is to be noted here that the base also served as a protective layer for the polarizing layer. On the other surface of the polarizing layer, an 80 μm thick TAC film (a protective layer) was bonded via a 5 μm thick PVA-based adhesive. Thus, a laminate of the optically compensating B-layer and the polarizing layer was obtained.

The optically compensating A-layer and the laminate of the polarizing plate and the optically compensating B-layer were bonded via a 25 μm thick acrylic pressure-sensitive adhesive so that the optically compensating A-layer faced the optically compensating B-layer. Thus, a polarizing plate (No. 2) with optical compensation function having a total thickness of 310 μm was obtained.

Example 3

The same polyimide solution as in Example 1 was applied onto an 80 μm thick TAC film, followed by drying at 120° C. for 10 minutes. Thus, a laminate of a 5 μm thick non-liquid crystalline polymer layer and the TAC film was obtained. The laminate was stretched transversely with a tenter to 1.05 times its original length so that the thickness of the laminate became 73 μm. This laminate included the stretched TAC film as an optically compensating A-layer and the stretched non-liquid crystalline polymer layer as an optically compensating B-layer.

This laminate was bonded to one surface of a polarizing layer obtained as above via a 5 μm thick PVA-based adhesive so that the stretched TAC film (the optically compensating A-layer) faced the polarizing layer. On the other surface of the polarizing layer, an 80 μm thick TAC film (a protective layer) was bonded via a 5 μm thick PVA-based adhesive. Thus, a polarizing plate (No. 3) with optical compensation function having a total thickness of 183 μm was obtained.

Example 4

A polarizing plate (No. 4) with optical compensation function having a total thickness of 183 μm was obtained in the same manner as in Example 3 except that the laminate of the optically compensating A-layer and the optically compensating B-layer was bonded so that the optically compensating B-layer (the stretched non-liquid crystalline polymer layer) faced the polarizing layer.

Example 5

A 70 μm thick polyester film (trade name: LUMIRROR, manufactured by Toray Industries. Inc.) was stretched transversely with a tenter to 1.2 times its original length at 160° C. Thus, a 59 μm thick stretched film (an optically compensating A-layer) was obtained.

The same polyimide solution as in Example 1 was applied onto this stretched film, followed by drying at 120° C. for 10 minutes. Thus, a laminate (thickness: 62 μm) of a 3 μm thick non-liquid crystalline polymer layer (an optically compensating B-layer) and the stretched film (the optically compensating A-layer) was obtained.

This laminate was bonded to one surface of a polarizing plate obtained as above via a 15 μm thick acrylic pressure-sensitive adhesive so that the stretched film (the optically compensating A-layer) faced the polarizing plate. Thus, a polarizing plate (No. 5) with optical compensation function having a total thickness of 267 μm was obtained.

Example 6

A polarizing plate (No. 6) with optical compensation function having a total thickness of 267 μm was obtained in the same manner as in Example 5 except that the laminate of the optically compensating A-layer and the optically compensating B-layer was bonded so that the optically compensating B-layer (the non-liquid crystalline polymer layer) faced the polarizing plate.

Comparative Example 1

An 80 μm thick TAC film (trade name: FUJITAC, manufactured by Fuji Photo Film Co., Ltd.) was stretched transversely with a tenter to 1.6 times its original length at 170° C., thereby obtaining a 50 μm thick stretched film (an optically compensating A-layer). This stretched film was bonded to one surface of a polarizing layer obtained as above via a 5 μm thick PVA-based adhesive. On the other surface of the polarizing layer, an 80 μm thick TAC film (a protective layer) was bonded via a 5 μm thick PVA-based adhesive. Thus, a polarizing plate (No. 11) with optical compensation function having a total thickness of 160 μm was obtained.

Comparative Example 2

A 100 μm thick norbornene resin film (trade name: ARTON, manufactured by JSR Corporation) was stretched with a tenter to 1.2 times its original length at 180° C., thereby obtaining a 90 μm thick stretched film (an optically compensating A-layer). This stretched film was bonded to one surface of a polarizing layer obtained as above via a 5 μm thick unsaturated polyester-based adhesive. On the other surface of the polarizing layer, an 80 μm thick TAC film (a protective layer) was bonded via a 5 μm thick PVA-based adhesive. Thus, a polarizing plate (No. 12) with optical compensation function having a total thickness of 180 μm was obtained.

Comparative Example 3

The same polyimide solution as in Example 1 was applied onto a 70 μm thick polyester film (a base), followed by drying at 120° C. for 10 minutes. Thus, a 5 μm thick non-liquid crystalline polymer layer (an optically compensating B-layer) was formed.

This optically compensating B-layer was bonded to one surface of a polarizing layer obtained as above via a 15 μm thick acrylic pressure-sensitive adhesive so that the optically compensating B-layer faced the polarizing layer. Thereafter, the polyester film was peeled off, thereby transferring the optically compensating B-layer onto the polarizing layer. On the other surface of the polarizing layer, an 80 μm thick TAC film (a protective layer) was bonded via a 5 μm thick PVA-based adhesive. Thus, a polarizing plate (No. 13) with optical compensation function having a total thickness of 125 μm was obtained.

With regard to the optically compensating A-layers and optically compensating B-layers of the polarizing plates with optical compensation function obtained in Examples 1 to 6 and in Comparative Examples 1 to 3, retardation values Re in the normal direction and the retardation values Rz in the thickness directions were measured using a retardation meter applying a parallel Nicol rotation method as a principle (trade name: KOBRA-21ADH, manufactured by Oji Scientific Instruments). The results are shown in Table 1.

TABLE 1

|  | optically compensating A-layer | | | | optically compensating B-layer | | | |
| --- | --- | --- | --- | --- | --- | --- | --- | --- |
|  | Re [nm] | Rz [nm] | Rz/Re | thickness [μm] | Re [nm] | Rz [nm] | Rz/Re | thickness [μm] |
| Example 1 | 50 | 108 | 2.2 | 80 | 5 | 180 | 36.0 | 5 |
| Example 2 | 50 | 52 | 1.0 | 90 | 5 | 180 | 36.0 | 5 |
| Example 3 | 30 | 38 | 1.3 | 73 | 22 | 200 | 9.1 | 5 |
| Example 4 | 30 | 38 | 1.3 | 73 | 22 | 200 | 9.1 | 5 |
| Example 5 | 50 | 144 | 2.9 | 59 | 4 | 91 | 22.75 | 3 |
| Example 6 | 50 | 144 | 2.9 | 59 | 4 | 91 | 22.75 | 3 |
| Comparative Example 1 | 50 | 68 | 1.4 | 50 | — | — | — | — |
| Comparative Example 2 | 50 | 144 | 2.9 | 73 | — | — | — | — |
| Comparative Example 3 | — | — | — | — | 5 | 180 | 36 | 5 |

Table 1 shows that the optically compensating B-layers are considerably thinner than the optically compensating A-layers. Therefore, the polarizing plates with optical compensation function including the respective optically compensating A-layers and optically compensating B-layers were thinner than a conventional laminated polarizing plate including two or more optically compensating A-layers.

(Evaluation Test)

Each of the polarizing plates (Nos. 1–6) with optical compensation function obtained in Examples 1–6 and the polarizing plates (Nos. 11–13) with optical compensation function obtained in Comparative Examples 11–13 was cut out to obtain a piece of 5 cm×5 cm. The piece and a polarizing plate, including no optically compensating layer, obtained as above were arranged on both surfaces of a VA type liquid crystal panel (trade name: DUAFFALO FTD-XT 15 FA, manufactured by Mel Corp.), respectively, so that the slow axes cross at right angles, thereby obtaining a liquid crystal display. Here, the optically compensating layer was located on the cell side.

Next, for the thus-obtained respective liquid crystal displays, viewing angles at contrast ratios of (Co)≧10 in a vertical direction, in a lateral direction, in a diagonal direction (45° to 225°), and in a diagonal direction (135° to 315°) were measured. The contrast ratios were obtained by, displaying a white image and a black image on each of the liquid crystal displays, for measuring the values of Y, x, and y in a XYZ display system at viewing angles of 0–70° at the front, upper and lower, and right and left sides of the display, by using an instrument (trade name: Ez contrast 160D, manufactured by ELDIM SA.). Based on the Y-value ($Y_W$) for the white image and the Y-value ($Y_B$) for the black image, the contrast ratio ($Y_W/Y_B$) for every viewing angle was calculated. The results are shown in Table 2.

TABLE 2

|  | Film type | | Viewing angle (°) | | | |
| --- | --- | --- | --- | --- | --- | --- |
|  | Front | Rear | Vertical | Lateral | Diagonal (45–225°) | Diagonal (135–315°) |
| Evaluation 1 | No. 11 (polarizing plate + A-layer) | No. 1 (polarizing plate + A-layer + B-layer) | ±80 | ±80 | ±70 | ±70 |
| Evaluation 2 | polarizing plate | No. 2 (polarizing plate + A-layer + B-layer) | ±80 | ±80 | ±65 | ±65 |
| Evaluation 3 | polarizing plate | No. 3 (polarizing plate + A-layer + B-layer) | ±80 | ±80 | ±65 | ±65 |
| Evaluation 4 | polarizing plate | No. 4 (polarizing plate + A-layer + B-layer) | ±80 | ±80 | ±65 | ±65 |
| Evaluation 5 | polarizing plate | No. 5 (polarizing plate + A-layer + B-layer) | ±80 | ±80 | ±70 | ±70 |
| Evaluation 6 | polarizing plate | No. 6 (polarizing plate + A-layer + B-layer) | ±80 | ±80 | ±70 | ±70 |
| Evaluation 7 | polarizing plate | No. 1 (polarizing plate + A-layer + B-layer) | ±80 | ±80 | ±65 | ±65 |
| Comparative Evaluation 1 | polarizing plate | polarizing plate | ±80 | ±80 | ±30 | ±30 |
| Comparative Evaluation 2 | polarizing plate | No. 12 (polarizing plate + A-layer) | ±80 | ±80 | ±40 | ±40 |
| Comparative Evaluation 3 | polarizing plate | No. 13 (polarizing plate + B-layer) | ±80 | ±80 | ±50 | ±50 |

As clarified from the results of Table 2, each of the liquid crystal displays including the polarizing plates with optical compensation function obtained in Examples 1–6 had a wide viewing angle. This shows that the polarizing plate with optical compensation function according to the present invention has excellent optical characteristics.

INDUSTRIAL APPLICABILITY

Therefore, the present invention can provide a thin polarizing plate with optical compensation function including two types of thin optically compensating layers capable of achieving desired retardation values. By using the polarizing plate, it becomes possible to provide a liquid crystal display that achieves excellent visibility and high display quality.

The invention claimed is:

1. A polarizing plate with optical compensation function, comprising at least two optically compensating layers, the optically compensating layers comprising:
   an optically compensating A-layer formed of a polymer film, satisfying conditions represented by formulae (I) and (II) below; and
   an optically compensating B-layer formed of a non-liquid crystalline polymer film, satisfying conditions represented by formulae (III) to (V) below, $$20 \text{ (nm)} \leq Re_a \leq 300 \text{ (nm)} \quad \text{(I)}$$

$$1.0 \leq Rz_a/Re_a \leq 8 \quad \text{(II)}$$

$$1 \text{ (nm)} \leq Re_b \leq 100 \text{ (nm)} \quad \text{(III)}$$

$$5 \leq Rz_b/Re_b \leq 100 \quad \text{(IV)}$$

$$1 \text{ (μm)} \leq d_b 20 \text{ (μm)} \quad \text{(V)}$$

in the formulae (I) and (II), $$Re_a = (nx_a - ny_a) \cdot d_a$$

$$Rz_a = (nx_a - nz_a) \cdot d_a$$

where $nx_a$, $ny_a$, and $nz_a$ represent refractive indices in an X-axis direction, a Y-axis direction, and a Z-axis direction in the optically compensating A-layer, respectively, with the X-axis direction being an axial direction exhibiting a maximum refractive index within a plane of the optically compensating A-layer, the Y-axis direction being an axial direction perpendicular to the X-axis within the plane, the Z-axis direction being a thickness direction perpendicular to the X-axis and the Y-axis, and $d_a$ represents a thickness of the optically compensating A-layer, in the formulae (III) to (V), $$Re_b = (nx_b - ny_b) \cdot d_b$$

$$Rz_b = (nx_b - nz_b) \cdot d_b$$

where $nx_b$, $ny_b$, and $nz_b$ represent refractive indices in an X-axis direction, a Y-axis direction, and a Z-axis direction in the optically compensating B-layer, respectively, with the X-axis direction being an axial direction exhibiting a maximum refractive index within a plane of the optically compensating B-layer, the Y-axis direction being an axial direction perpendicular to the X-axis within the plane, the Z-axis direction being a thickness direction perpendicular to the X-axis and the Y-axis, and $d_b$ represents a thickness of the optically compensating B-layer.

2. The polarizing plate with optical compensation function according to claim 1, wherein the polymer film forming the optically compensating A-layer is a stretched film or a liquid crystal film.

3. The polarizing plate with optical compensation function according to claim 2, wherein the nonliquid crystalline polymer film forming the optically compensating B-layer is a film of at least one selected from the group consisting of polyamide, polyimide, polyester, polyetherketone, polyaryletherketone, polyamide imide, and polyesterimide.

4. The polarizing plate with optical compensation function according to claim 2, further comprising a pressure-sensitive adhesive layer, the pressure-sensitive adhesive layer being arranged on at least one surface of the polarizing plate.

5. A liquid crystal display comprising a liquid crystal cell and a polarizing plate, wherein the polarizing plate is the polarizing plate according to claim 2 and is arranged on at least one surface of the liquid crystal cell.

6. An image display comprising the polarizing plate according to claim 2.

7. The polarizing plate with optical compensation function according to claim 1, wherein the non-liquid crystalline polymer film forming the optically compensating B-layer is a film of at least one selected from the group consisting of polyamide, polyimide, polyester, polyetherketone, polyaryletherketone, polyamide imide, and polyesterimide.

8. The polarizing plate with optical compensation function according to claim 7, further comprising a pressure-sensitive adhesive layer, the pressure-sensitive adhesive layer being arranged on at least one surface of the polarizing plate.

9. A liquid crystal display comprising a liquid crystal cell and a polarizing plate, wherein the polarizing plate is the polarizing plate according to claim 7 and is arranged on at least one surface of the liquid crystal cell.

10. An image display comprising the polarizing plate according to claim 7.

11. The polarizing plate with optical compensation function according to claim 1, further comprising a pressure-sensitive adhesive layer, the pressure-sensitive adhesive layer being arranged on at least one surface of the polarizing plate.

12. A liquid crystal display comprising a liquid crystal cell and a polarizing plate, wherein the polarizing plate is the polarizing plate according to claim 11 and is arranged on at least one surface of the liquid crystal cell.

13. An image display comprising the polarizing plate according to claim 11.

14. A liquid crystal display comprising a liquid crystal cell and a polarizing plate, wherein the polarizing plate is the polarizing plate according to claim 1 and is arranged on at least one surface of the liquid crystal cell.

15. An image display comprising the polarizing plate according to claim 1.

* * * * *